United States Patent
Sato et al.

(10) Patent No.: US 7,158,345 B2
(45) Date of Patent: Jan. 2, 2007

(54) THIN-FILM MAGNETIC HEAD APPROPRIATELY SUPPRESSING SIDE FRINGING AND METHOD FOR FABRICATING THE SAME

(75) Inventors: Kiyoshi Sato, Niigata-ken (JP); Toshinori Watanabe, Niigata-ken (JP); Hideki Gochou, Niigata-ken (JP); Kiyoshi Kobayashi, Niigata-ken (JP); Toru Takahashi, Niigata-ken (JP); Hisayuki Yazawa, Niigata-ken (JP); Masaki Ikegami, deceased, late of Niigata-ken (JP); by Hiromi Ikegami, legal representative, Niigata-ken (JP); by Chiaki Ikegami, legal representative, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/016,949

(22) Filed: Dec. 20, 2004
(Under 37 CFR 1.47)

(65) Prior Publication Data
US 2005/0168870 A1  Aug. 4, 2005

Related U.S. Application Data

(63) Continuation of application No. 09/802,314, filed on Mar. 8, 2001.

(30) Foreign Application Priority Data
Mar. 9, 2000  (JP) .............................. 2000-065288

(51) Int. Cl.
*G11B 5/127*  (2006.01)
(52) U.S. Cl. ...................... 360/126; 360/317
(58) Field of Classification Search ................ 360/317, 360/126
See application file for complete search history.

(56) References Cited

U.S. PATENT DOCUMENTS

| 5,126,907 A | * | 6/1992 | Hamakawa et al. | ........ 360/126 |
| 5,452,164 A | | 9/1995 | Cole et al. | ............... 29/603.14 |
| 5,649,351 A | | 7/1997 | Cole et al. | ............... 29/603.14 |

(Continued)

FOREIGN PATENT DOCUMENTS

JP  8-339508  12/1996

(Continued)

OTHER PUBLICATIONS

Office Action from the Japanese Patent Office issued on Oct. 21, 2003 for the corresponding Japanese Patent Application Publication No. 2000-065280 filed Mar. 4, 2000 (with English translation thereof).

*Primary Examiner*—Tianjie Chen
(74) *Attorney, Agent, or Firm*—Brinks Hofer Gilson & Lione

(57) ABSTRACT

A thin-film magnetic head includes a lower core layer; a recording core formed on the lower core layer and exposed at a face surface facing a recording medium, the recording core including a gap layer, an upper pole layer, and optionally, a lower pole layer; an upper core layer magnetically coupled to the upper pole layer; and a coil. A tip surface of the upper core layer at the face surface is set back from the face surface in the height direction, and the tip surface is an inclined surface or a curved surface in which the depth gradually increases from the track width direction. A method for fabricating a thin-film magnetic head is also disclosed.

9 Claims, 19 Drawing Sheets

U.S. PATENT DOCUMENTS

| | | | |
|---|---|---|---|
| 5,652,687 A | 7/1997 | Chen et al. | 360/136 |
| 5,802,700 A | 9/1998 | Chen et al. | 360/317 |
| 5,805,391 A | 9/1998 | Chang et al. | 360/317 |
| 6,101,068 A | 8/2000 | Ohtomo et al. | 360/126 |
| 6,154,347 A | 11/2000 | Sasaki | 360/317 |
| 6,156,375 A | 12/2000 | Hu et al. | 427/116 |
| 6,337,783 B1 * | 1/2002 | Santini | 360/317 |
| 6,404,601 B1 * | 6/2002 | Rottmayer et al. | 360/317 |
| 6,487,041 B1 | 11/2002 | Yamanaka et al. | 360/126 |
| 6,504,676 B1 * | 1/2003 | Hiner et al. | 360/126 |
| 6,597,543 B1 | 7/2003 | Saitho et al. | 360/317 |
| 6,671,133 B1 * | 12/2003 | Sasaki | 360/317 |

FOREIGN PATENT DOCUMENTS

| | | |
|---|---|---|
| JP | 10-269523 | 10/1998 |
| JP | 11-312303 | 11/1999 |
| JP | 2000-11319 A | 1/2000 |
| JP | 2000-251219 | 9/2000 |
| JP | 2001-176022 | 6/2001 |

* cited by examiner

SURFACE FACING RECORDING MEDIUM

THIN-FILM MAGNETIC HEAD APPROPRIATELY SUPPRESSING SIDE FRINGING AND METHOD FOR FABRICATING THE SAME

This application is a Continuation of pending U.S. patent application Ser. No. 09/802,314, filed Mar. 8, 2001, which claims the benefit of priority to Japanese Patent Application No. 2000-065288, both of which are herein incorporated by reference.

BACKGROUND OF THE INVENTION

1. Field of the Invention

The present invention relates, generally, to a thin-film magnetic write head such as a floating type magnetic head and more particularly, the invention relates to a thin-film magnetic head in which side fringing can be appropriately suppressed and that can be fabricated with a high degree of consistency, and to a method for fabricating the same.

2. Description of the Related Art

FIG. 24 is a partial front view showing the structure of a conventional thin-film magnetic head (inductive head), and FIG. 25 is a partial sectional view of the thin-film magnetic head shown in FIG. 24. As shown in FIG. 24, insulating layers 3 are formed on both sides of a lower core layer 1 composed of a magnetic material, such as Permalloy. A gap layer 4 and an upper pole layer 5 are formed with a track width Tw on the lower core layer 1, and also are formed so as to be exposed at a surface facing a recording medium. As shown in FIG. 25, the gap layer 4 extends on the lower core layer 1 to a position at which a base 10b of an upper core layer 10, which will be described below, and the lower core layer 1 come into contact with each other, and the upper pole layer 5 extends onto a Gd-setting insulating layer 6 formed on the gap layer 4. Additionally, the gap layer 4 is composed of a nonmetallic insulating material, such as $SiO_2$.

As shown in FIGS. 24 and 25, an insulating layer 7 is formed so as to be disposed on both sides of the upper pole layer 5 in the track width direction (in the X direction in the drawing) and to extend in the height direction (in the Y direction in the drawing). On the insulating layer 7, a coil layer 13 is spirally patterned, and the coil layer 13 is embedded in an insulating layer 9 composed of an organic insulating material.

The upper core layer 10 is formed, for example, by frame plating, on the insulating layer 9, and a tip 10a of the upper core layer 10 is magnetically coupled to the upper pole layer 5 and also is formed so as to be exposed at the surface facing the recording medium. The base 10b of the upper core layer 10 is magnetically coupled to the lower core layer 1. As shown in FIG. 24, the entirety of a tip surface 10c of the upper core layer 10 is formed so as to be exposed at the surface facing the recording medium.

A method for fabricating the thin-film magnetic head shown in FIGS. 24 and 25 will be described with reference to FIGS. 26 to 32. As shown in FIG. 26, the gap layer 4 composed of an insulating material, such as $SiO_2$, is formed over the entire surface of the lower core layer 1, and a resist layer 11 having a groove 11a that is equal to the track width Tw is formed on the gap layer 4. The groove 11a is formed with a predetermined length from the surface facing the recording medium in the height direction (in the Y direction in the drawing). The upper pole layer 5 composed of, for example, an NiFe alloy, is plated in the groove 11a, and the resist layer 11 is removed.

As shown in FIG. 27, the width of the upper pole layer 5, i.e., the track width Tw, is set, for example, at 0.45 μm, and a height h1 is set at approximately 3.5 to 3.8 μm. Both sides of the upper pole layer 5 in the track width direction (in the X direction in the drawing) are etched by ion milling (trimming step). During the ion milling process, as shown in FIG. 28, portions of the gap layer 4 exceeding the width of the upper pole layer 5 are trimmed away and also the upper surface of the lower core layer 1 on both sides are trimmed, and thus a protrusion 1b and inclined planes 1a are formed on the lower core layer 1.

In the step shown in FIG. 29, the insulating layer 7, composed of $Al_2O_3$ or the like, is formed on the lower core layer 1 on both sides of the upper pole layer 5 so as to embed the upper pole layer 5 in the insulating layer 7. Then, , as shown in FIG. 30, the insulating layer 7 is polished at the line A—A using a CMP technique.

Next, the coil layer 13 and the insulating layer 9 shown in FIG. 25 are formed. Then, as shown in partial plan view in FIG. 31, a resist layer 12 is formed over the insulating layers 7 and 9 and the upper pole layer 5. A portion corresponding to a pattern 12a of the resist layer 12 is exposed and developed, and the portion corresponding to the pattern 12a is removed.

A magnetic material is plated in the pattern 12a, and the resist layer 12 is removed, and thus the upper core layer 10 is formed. FIG. 32 shows the structure in the vicinity of the tip of the thin-film magnetic head.

The trimming step described above and shown in FIG. 27 is usually carried out twice. In the first trimming step, ion irradiation is performed substantially perpendicular to the plane direction of the lower core layer 1. In this step, the gap layer 4 extending on both sides of the lower surface of the upper pole layer 5 is trimmed, and portions of the lower core layer 1 under the gap layer 4 are also trimmed, and thus the protrusion 1b of the lower core layer 1 is formed. Since magnetic dust generated by trimming of the gap layer 4 and the lower core layer 1 adheres to the sides of the upper pole layer 5, in the second trimming step, ion irradiation is performed in more inclined directions in comparison with the first trimming step so that the magnetic dust is removed and the inclined planes 1a are formed on the lower core layer 1 on both sides of the protrusion 1b.

However, in the thin-film magnetic head shown in FIGS. 24 and 25, since the tip surface 10c of the upper core layer 10 having a width larger than the track width Tw is formed so as to be exposed at the surface facing the magnetic medium, side fringing occurs between the upper core layer 10 and the upper pole layer 5 due to magnetic leakage, resulting in a decrease in a real density.

Consequently, in order to fabricate a thin-film magnetic head which is suitable for an increased recording density, in addition to a decrease in the track width Tw, side fringing must be reduced.

In the method for fabricating the thin-film magnetic head shown in FIGS. 24 and 25, the trimming step is carried out, and in the trimming step, variations in the track width Tw and in the shape occur, and also the height of the upper pole layer 5 is significantly decreased.

The reason for carrying out the trimming step is that in the state shown in FIG. 27, since the gap layer 4 and the lower core layer 1 extend on both sides of the lower surface of the upper pole layer 5, side fringing easily occurs between the upper pole layer 5 and the lower core layer 1. As shown in FIG. 28, by trimming the gap layer 4 extending on both sides of the lower surface of the upper pole layer 5 and by further forming the protrusion 1b and the inclined planes 1a, the distance between the upper pole layer 5 and the lower core layer 1 can be increased, and thus the side fringing is believed to be appropriately suppressed.

However, when the trimming step is carried out, variations in the amount of magnetic dust adhering to both sides of the upper pole layer 5 and variations during the removal of the magnetic dust occur. Also, as described above, in the first trimming step, since the ion irradiation is performed substantially perpendicular to the plane direction of the lower core layer 1, the height of the upper pole layer 5 is significantly decreased. As a result, variations easily occur in the track width Tw and the shape of the upper pole layer 5, and a significant decrease in the height of the upper pole layer 5 and variations in the height may also occur.

Consequently, if the trimming step is carried out, the uniformity during the fabrication of thin-film magnetic heads is reduced, and due to the decrease in the height of the upper pole layer 5, the volume of the upper pole layer 5 is decreased. Thus, the upper pole layer 5 is easily magnetically saturated, resulting in degradation in recording characteristics.

SUMMARY OF THE INVENTION

Accordingly, objects of the present invention are to provide a thin-film magnetic head in which side fringing can be appropriately suppressed and which can be fabricated with a high degree of consistency, and to provide a method for fabricating the same.

In one aspect of the present invention, a thin-film magnetic head includes a lower core layer; a recording core formed on the lower core layer and exposed at a face surface facing a recording medium, in which a lower pole layer, a gap layer, and an upper pole layer are deposited in that order, or in which a gap layer and an upper pole layer are sequentially deposited in that order; an upper core layer magnetically coupled to the upper pole layer; and a coil for inducing a recording magnetic field to the lower core layer, the recording core, and the upper core layer. A tip surface of the upper core layer at the face surface is set back from the face surface in a direction generally perpendicular to the face surface, which is referred to hereinafter as the height direction. The tip surface is an inclined surface or a curved surface in which the depth gradually increases in a direction generally parallel to the face surface, which hereinafter is referred to as the track width direction.

In the present invention, since the tip surface of the upper core layer is set back from the face surface in the height direction, and also the tip surface is an inclined surface or a curved surface in which the depth gradually increases in the track width direction, the tip surface of the upper core layer is not exposed, in contrast to the conventional case. Consequently, in the present invention, it is possible to appropriately suppress side fringing, and simultaneously, the flux from the upper core layer can be efficiently applied to the upper pole layer, and thus it is possible to fabricate a thin-film magnetic head which is suitable for an increased recording density.

In the present invention, preferably, the shortest setback distance L3 from the face surface to the tip surface of the upper core layer is equal to or less than the largest length of the recording core from the face surface in the height direction Furthermore, the setback distance L3 preferably satisfies the relationship about 0 μm<L3≦about 0.8 μm.

In the present invention, preferably, the upper core layer is provided with a back surface which is set back from the tip surface in the height direction, the back surface is a curved surface or an inclined surface in which the depth gradually increases in the track width direction, and an inclination angle θ2 is greater than an inclination angle θ1, where angle θ1 is one of the inclination angles of the inclined surface relative to the height direction, or the inclination angle of a tangent at a midpoint between an end of the curved surface near the recording core and an end of the curved surface at an upper surface of the upper core layer, and inclination angle θ2 is the inclination angle of the tip surface of the upper core layer relative to the height direction, or the inclination angle of a tangent line at the midpoint between an end of the curved surface near the recording core and an end of the curved surface on an upper core layer. In a preferred embodiment, the inclination angle θ2 satisfies the relationship about 60°≦θ2<about 90°.

In such a structure, the flux from the upper core layer can be efficiently applied to the upper pole layer, and thus recording characteristics can be improved.

In the present invention, preferably, the tip surface of the upper core layer at the face surface has a curvature which gradually recedes in the height direction toward both sides in the track width direction. In such a structure, it is possible to suppress side fringing.

Since the tip surface of the upper core layer has a curvature, when the upper core layer is patterned on the upper pole layer, even if the upper core layer is slightly deviated from the predetermined position relative to the upper pole layer, it is possible to reduce the side fringing in comparison with the conventional thin-film magnetic head.

In such a structure, with a tangent line touching each end of the curvature in the track width, preferably, the inclination of the tangent line relative to the track width direction is about 30° to about 60°.

In the present invention, preferably, the upper core layer includes a front region which extends from the tip surface in the height direction and has a uniform width in the track width direction; and a back region which extends from a side opposite the front region in the height direction and in which the width in the track width direction gradually increases in the height direction.

In the present invention, preferably, the upper core layer includes a front region which extends from the curved end at the tip surface in the height direction and has a uniform width in the track width direction; and a back region which extends from a side opposite the front region in the height direction and in which the width in the track width direction gradually increases in the height direction.

Preferably, at the edge in which the upper core layer is connected to the upper pole layer, the width of the upper core layer in the track width direction is greater than the width of the upper pole layer in the track width direction. In such a structure, the flux from the upper core layer can be efficiently applied to the upper pole layer, and thus recording characteristics can be improved.

In the present invention, preferably, the recording core includes a front region which extends from the face surface in the height direction and has a uniform width in the track width direction; and a back region which extends from the front region in the height direction and in which the width in the track width direction gradually increases in the height direction. If the recording core is provided with such a back region having a large track width Tw, it is possible to increase the contact area between the recording core and the upper core layer.

In the structure described above, preferably, the upper core layer overlaps at least the back region of the recording core.

In the present invention, the gap layer is preferably composed of a nonmagnetic metallic material, and the nonmagnetic metallic material is preferably at least one material selected from the group consisting of NIP, NiPd, NiW, NiMo, Au, Pt, Rh, Pd, Ru, and Cr.

In another aspect of the present invention, a method for fabricating a thin-film magnetic head includes the step of:

(a) forming a recording core on a lower core layer, the recording core comprising one of (1) a lower pole layer, a gap layer, and an upper pole layer sequentially deposited in that order on the lower core layer, wherein a width of the lower pole layer and the upper pole layer in a track width direction, wherein the track width direction is generally parallel to the face surface is determined at the face surface or (2) a gap layer and an upper pole layer sequentially deposited in that order on the lower core layer, wherein a width of the upper pole layer in the track width direction is determined at the face surface;

(b) forming an insulating layer at a periphery of the recording core at one of before or after step (a), and making an upper surface of the recording core and an upper surface substantially level with each other;

(c) forming a resist layer over the recording core and the insulating layer;

(d) forming a core layer pattern in the resist layer by exposing and developing a region other than the core layer pattern so that a tip surface of the pattern is one of an inclined surface or a curved surface which recedes in the height direction as the tip surface ascends from the recording core, and the tip surface is set back from the surface in the height direction; and (e) forming the upper core layer by plating a magnetic material in the core layer pattern so that the tip surface of the upper core layer is set back from the face surface in the height direction and the tip surface of the upper core layer is one of an inclined surface or a curved surface in which the depth in the height direction gradually increases in a track width direction.

In the present invention, preferably, in step (d), the tip surface of the core layer pattern at the face surface gradually recedes in the height direction toward each of two side surfaces that are spaced apart in the track width direction, and wherein in step (e), the upper core layer is formed so that the tip surface has a curvature.

In the present invention, the gap layer is preferably composed of a nonmagnetic metallic material for plating, and the nonmagnetic metallic material is preferably at least one material selected from the group consisting of NiP, NiPd, NiW, NiMo, Au, Pt, Rh, Pd, Ru, and Cr.

In accordance with the fabrication method in the present invention, it is possible to fabricate thin-film magnetic heads, without variations in the track width Tw and the height of recording cores, with a satisfactory degree of consistency, and it is also possible to easily fabricate thin-film magnetic heads capable of suppressing side fringing.

When the resist layer for forming the pattern of the upper core layer is exposed and developed, by exposing and developing the region other than the core layer pattern, it is possible to form the tip surface of the patterned upper core layer to be an inclined surface or a curved surface in which the depth gradually increases in the track width direction.

DESCRIPTION OF THE PREFERRED EMBODIMENTS

Figure 1:
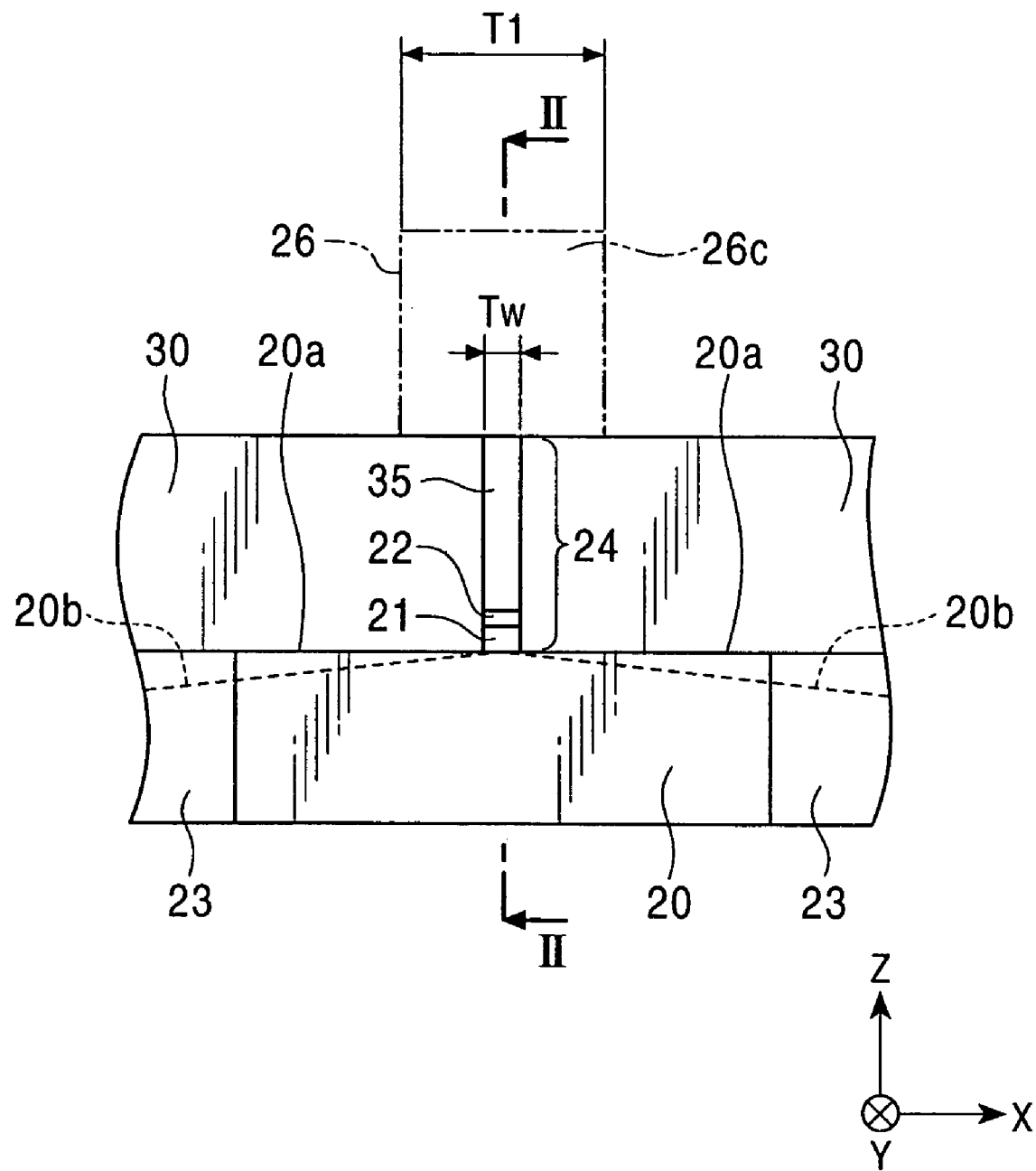
FIG. 1 is a partial front view of a thin-film magnetic head in accordance with an embodiment of the present invention.
Figure 2:
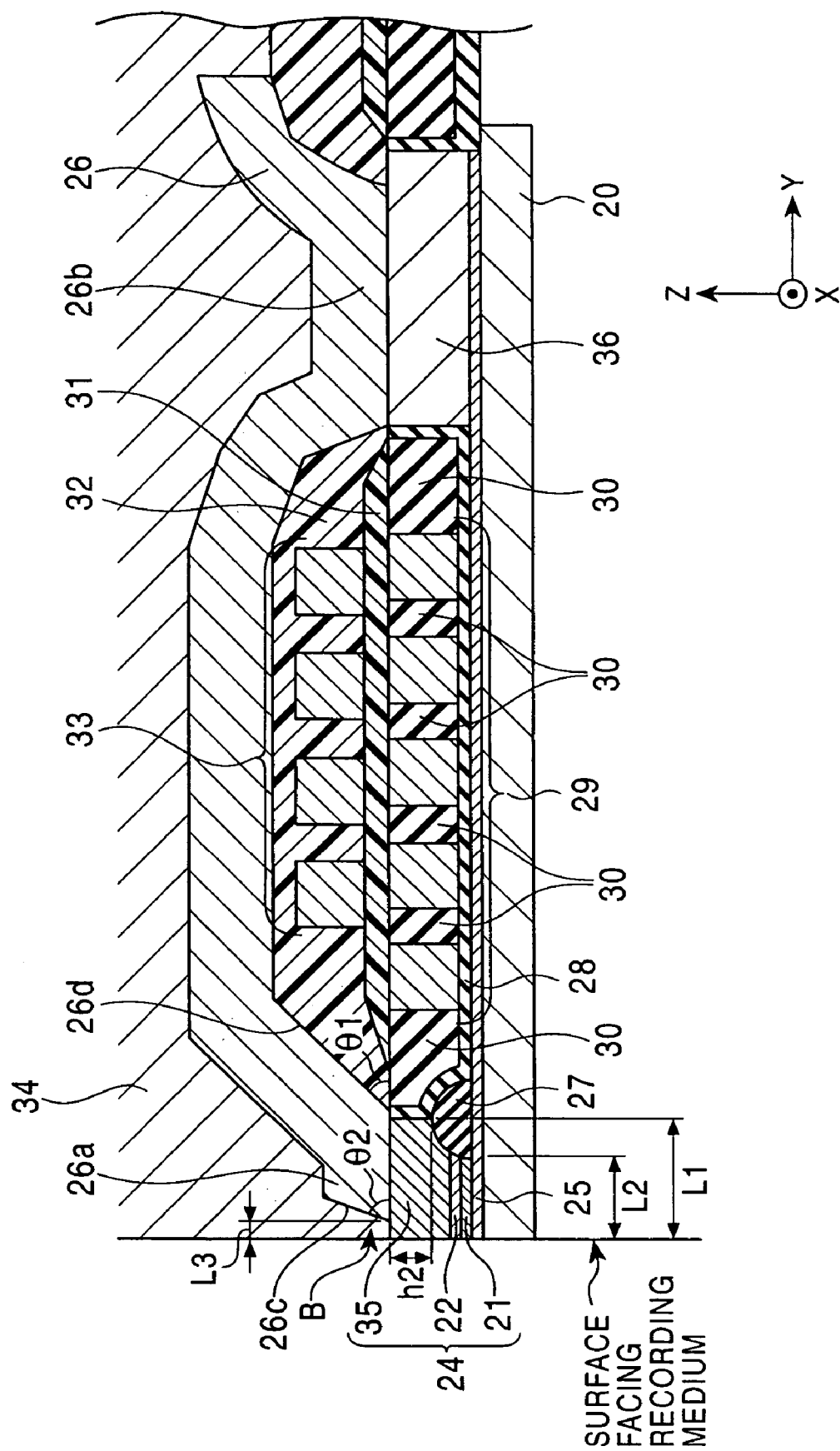
FIG. 2 is a partial cross-sectional view taken along the line II—II of FIG. 1.
Figure 3:
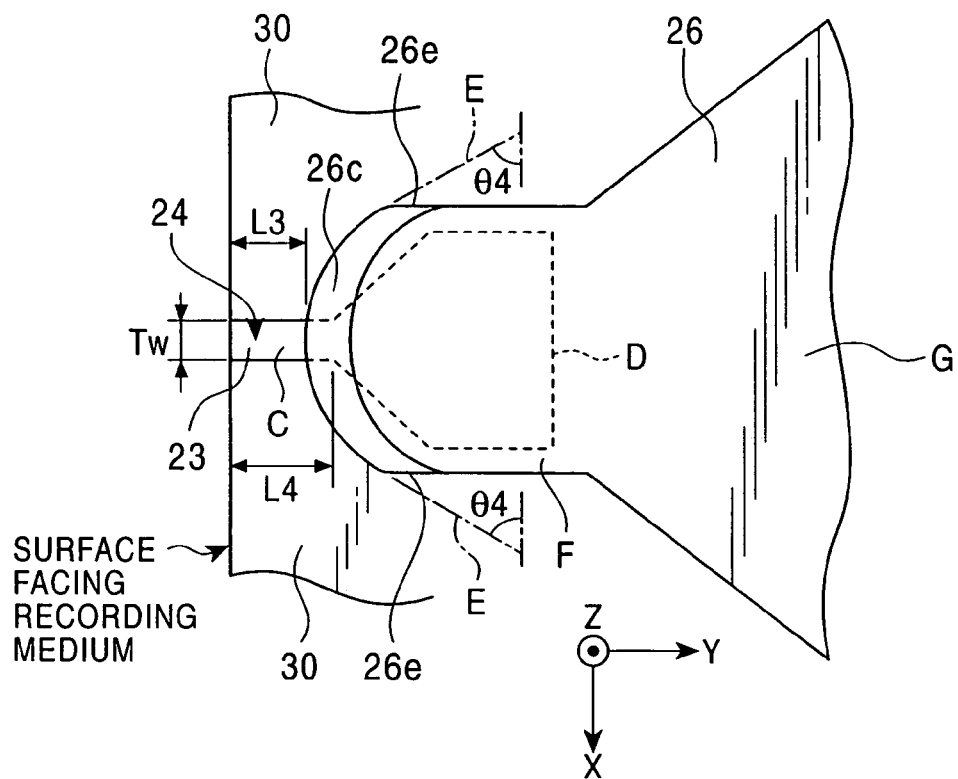
FIG. 3 is a partial plan view of the thin-film magnetic head shown in FIGS. 1 and 2.
Figure 4:
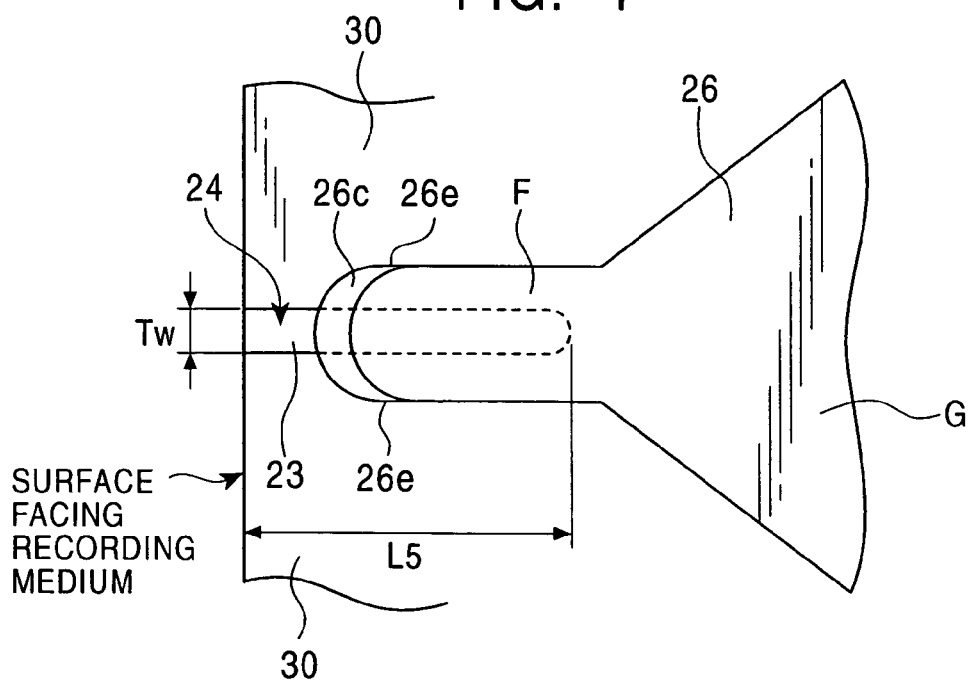
FIG. 4 is a partial plan view showing another shape of the thin-film magnetic head shown in FIGS. 1 and 2.

FIG. 1 is a partial front view of a thin-film magnetic head in accordance with an embodiment of the present invention, FIG. 2 is a partial sectional view taken along the line II—II of FIG. 1, and FIGS. 3 and 4 are partial plan views of examples of thin-film magnetic heads of the present invention.

Although a thin-film magnetic head shown in FIG. 1 is an inductive write head, a read head using a magnetoresistive effect (MR head) may be deposited on the lower surface of the inductive head. A lower core layer 20 shown in FIGS. 1 and 2 is composed of a magnetic material, such as Permalloy. Additionally, when a read head is deposited on the lower surface of the lower core layer 20, a shielding layer for protecting a magnetoresistive element from noise may be provided. Alternatively, without providing the shielding layer, the lower core layer 20 may be also used as an upper shielding layer of the read head.

As shown in FIG. 1, insulating layers 23 are formed on both sides of the lower core layer 20. An upper surface 20a extending from the base of a lower pole layer 21, which will be described below, may be parallel to the track width direction (the X direction in the drawing), or inclined planes 20b which incline toward a direction opposite to an upper core layer 26 may be formed. By forming the inclined planes 20b in the upper surface of the lower core layer 20, side fringing can be suppressed more appropriately.

As shown in FIGS. 1 and 2, a recording core 24 is formed on the lower core layer 20 so as to be exposed at a surface facing a recording medium. In this embodiment, the recording core 24 is formed with a track width Tw, (i.e., the recording core 24 is a track-width-defining section). The track width Tw is preferably about 0.7 μm or less, and more preferably about 0.5 μm or less.

In the embodiment shown in FIGS. 1 and 2, the recording core 24 has a layered structure including three layers: the lower pole layer 21, a gap layer 22, and an upper pole layer 35. The pole layers 21 and 35 and the gap layer 22 will be described below.

The lower pole layer 21, which is the lowest layer of the recording core 24, is formed by plating on the lower core layer 20. The lower pole layer 21 is magnetically coupled to the lower core layer 20, and the material for the lower pole layer 21 may be the same as or be different from that for the lower core layer 20. The lower pole layer 21 may be composed of either a single-layered film or a multi-layered film. The height of the lower pole layer 21 is set, for example, at approximately 0.3 μm. The gap layer 22, which is nonmagnetic, is deposited on the lower pole layer 21. In the present invention, preferably, the gap layer 22 is composed of a nonmagnetic metallic material and is formed by plating on the lower pole layer 21. The nonmagnetic metallic material is preferably at least one material selected from the group consisting of NiP, NiPd, NiW, NiMo, NiRh, Au, Pt, Rh, Pd, Ru, and Cr, and the gap layer 22 may be composed of either a single-layered film or a multi-layered film. The height of the gap layer 22 is set, for example, at approximately 0.2 μm.

The upper pole layer 35, which is magnetically coupled to the upper core layer 26, is formed by plating on the gap layer 22. The material for the upper pole layer 35 may be the same as or be different from-that for the upper core layer 26. The height of the upper pole layer 35 is set, for example, at about 2.4 to about 2.7 μm.

When the gap layer 22 is composed of the nonmagnetic metallic material as described above, it is possible to form the lower pole layer 21, the gap layer 22, and the upper pole layer 35 continuously by plating. Additionally, in the present invention, the recording core 24 is not limited to the layered structure including three layers. The recording core 24 may have a layered structure including two layers, the example, the gap layer 22 and the upper pole layer 35.

As described above, the materials for the lower pole layer 21 and the upper pole layer 35 constituting the recording core 24 may be the same as or different from those for the core layers to which the pole layers are magnetically coupled. In order to improve the recording density, the lower pole layer 21 and the upper pole layer 35 preferably have higher saturation magnetic flux densities than those of the corresponding lower and upper core layers to which the pole layers are magnetically coupled. If the lower pole layer 21 and the upper pole layer 35 have high saturation magnetic flux densities, it is possible to concentrate the recording magnetic field in the vicinity of the gap, thus improving the recording density.

As shown in FIG. 2, a plating underlayer 25 is formed between the lower pole layer 21 and the lower core layer 20. As shown in FIG. 2, the recording core 24 is formed with a length L1 from the surface facing the recording medium (ABS) in the height direction (in the Y direction in the drawing).

A Gd-setting insulating layer 27 composed of a resist or the like is formed on the plating underlayer 25, and the Gd-setting insulating layer 27 has, for example, a curved surface. As shown in FIG. 2, the upper pole layer 35 extends over the curvature.

The height h2 of the upper pole layer 35 on the Gd-setting insulating layer 27 is set, for example, at approximately 1.4 μm to 1.7 μm. In the conventional thin-film magnetic head, the height of the upper pole layer thereof was smaller than the height h2, and it was not possible to increase the volume of the upper pole layer. In contrast, in the present invention, the height h2 of the upper pole layer 35 can be increased and the volume of the upper pole layer 35 can be increased. The reason for this is that, as will be disclosed in a fabrication method described below, trimming performed perpendicular to the plane of the lower core layer 20 is not required.

By forming the upper pole layer 35 over the Gd-setting insulating layer 27, the length L1 of the upper pole layer 35 can be increased, and thus the volume of the upper pole layer 35 can be further increased. Therefore, even when the recording density is increased, the magnetic saturation of the upper pole layer 35 can be reduced, and recording characteristics can be improved.

As shown in FIG. 2, the length L2 from the front surface of the Gd-setting insulating layer 27 to the surface facing the recording medium is defined as the gap depth Gd, and since the gap depth Gd greatly influences the electrical characteristics of the thin-film magnetic head, the gap depth Gd is set at a predetermined length. In the embodiment shown in FIG.

2, the gap depth Gd is defined by the position of the Gd-setting insulating layer 27 formed on the lower core layer 20.

As further shown in FIG. 2, a coil layer 29 is spirally patterned over the lower core layer 20 at the back of the recording core 24 in the height direction (in the Y direction in the drawing) with an insulating underlayer 28 and the plating underlayer 25 therebetween. The insulating underlayer 28 is preferably composed of at least one insulating material selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

The spaces between individual conducting sections of the coil layer 29 are filled by an insulating layer 30. The insulating layer 30 is preferably composed of at least one insulating material selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

As shown in FIG. 1, the insulating layer 30 is formed on each side in the track width direction (in the X direction) of the recording core 24, and the insulating layer 30 is exposed at the surface facing the recording medium.

As shown in FIG. 2, an insulating layer 31 composed of an organic insulating material, such as a resist or a polyamide, is formed on the insulating layer 30, and a second coil layer 33 is spirally patterned on the insulating layer 31. The second coil layer 33 is covered by an insulating layer 32 composed of an organic material, such as a resist or a polyamide, and the upper core layer 26, which is preferably composed of an NiFe alloy or the like, is patterned, for example, by frame plating, on the insulating layer 32.

A tip 26a of the upper core layer 26 is magnetically coupled to the upper pole layer 35, and a base 26b of the upper core layer 26 is magnetically coupled to an elevating layer 36 composed of a magnetic material, such as an NiFe alloy, which is formed on the lower core layer 20. Additionally, the elevating layer 36 may not be provided, and in such a case, the base 26b of the upper core layer 26 is directly connected to the lower core layer 20 through the plating layer 25.

In the thin-film magnetic head shown in FIG. 2, although two coil layers are deposited, the coil may be single-layered. In such a case, for example, the space at the back of the recording core 24 in the height direction on the lower core layer 20 is filled by the insulating layer 30, and the coil layer is formed on the insulating layer 30. Alternatively, the second coil layer 33 shown in FIG. 2 is not formed, and the upper core layer 26 is formed over the insulating layer 31.

As shown in FIGS. 1 and 2, a tip surface 26c of the upper core layer 26 is not exposed at the surface facing the recording medium, and is set back from the surface facing the recording medium in the height direction (in the Y direction in the drawing). In the present invention, by setting the tip surface 26c of the upper core layer 26 back from the surface facing the recording medium in the height direction, it is possible to appropriately suppress side fringing.

As shown in FIG. 1, the width T1 in the track width direction (in the X direction) of the tip surface 26c of the upper core layer 26 is greater than the track width Tw. Consequently, if the tip surface 26c of the upper core layer 26 is exposed at the surface facing the recording medium, side fringing easily occurs due to flux leakage, and it is not possible to fabricate a thin-film magnetic head which is suitable for an increased recording density. Accordingly, in the present invention, as described above, the tip surface 26c of the upper core layer 26 is set back in the height direction from the surface facing the recording medium so as to prevent the tip surface 26c from being exposed at the surface facing the recording medium. Consequently, it is possible to appropriately avoid side fringing between the upper pole layer 35, which is exposed at the surface facing the recording medium, and the upper core layer 26, and a thin-film magnetic head which is suitable for an increased recording density can be fabricated.

As shown in FIGS. 2 and 3, the shortest setback distance L3 from the surface facing the recording medium to the tip surface 26c of the upper core layer 26 is equal to or less than the largest length (L1) of the recording core from the surface facing the recording medium in the height direction, and the setback distance L3 preferably satisfies the relationship about 0 µm<L3≦about 0.8 µm. By setting the setback distance L3 at about 0.8 µm or less, flux from the upper core layer 26 can be applied to the upper pole layer 35 substantially without loss.

As shown in FIG. 2, the tip surface 26c of the upper core layer 26 is an inclined surface in which the depth in the height direction (in the Y direction) gradually increases from the lower core layer side to the upper core layer side (in the Z direction). Alternatively, the tip surface 26c may be a curved surface in which the depth in the height direction gradually increases from the lower core layer side to the upper core layer side. That is, the inclination angle θ2 of the tip surface 26c relative to the height direction (the Y direction), or when the tip surface 26c is a curved surface, the inclination angle θ2 of the tangent at the midpoint between the end of the 15 curved surface on the lower core layer side and the end of the curved surface on the upper core layer side is set at less than 90°.

The advantage of setting the inclination angle θ2 at less than 90° is in that the upper core layer 26 is covered by a protective layer 34 composed of an insulating material, such as $Al_2O_3$, and by setting the inclination angle θ2 at less than 90°, it is possible to completely fill the space B between the tip 26a of the upper core layer 26 and the surface facing the recording medium by the protective layer 34.

As described above, although the inclination angle θ2 is preferably less than 90°, there is a further limitation described as follows. In the present invention, the upper core layer 26 is provided with a back surface 26d at the back of the tip surface 26c, and the back surface 26d is an inclined surface or a curved surface in which the depth in the height direction gradually increases from the lower core layer side to the upper core layer side. Preferably, the inclination θ2 is greater than an inclination angle θ1, where angle θ1 is the inclination angle of the inclined surface relative to the height direction or the inclination angle of the tangent at the midpoint between the end of the curved surface on the lower core layer side and the end of the curved surface on the upper core layer side relative to the height direction.

By setting the inclination angle θ2 of the tip surface 26c greater than the inclination angle θ1 of the back surface 26d as described above, it is possible to prevent the tip 26a of the upper core layer 26 from tapering, and the flux from the upper core layer 26 can be efficiently applied to the upper pole layer 35, thus improving recording characteristics.

In the present invention, the inclination angle θ2, more preferably, satisfies the relationship about 60°≦θ2<about 90°. If the inclination angle θ2 is less than about 60°, the tapering of the tip 26a of the upper core layer 26 increases and the volume of the tip 26a decreases, and thus the transfer efficiency of flux flowing from the upper core layer 26 to the upper pole layer 35 is easily decreased. Additionally, when the tip surface 26c is a curved surface in which the depth gradually increases from the lower core layer side to the upper core layer side, the curved surface may be either convex or concave.

Next, as shown in FIG. 3, the tip surface 26c of the upper core layer 26 has a curvature which gradually recedes in the height direction toward both sides in the track width direction.

Since the tip surface 26c of the upper core layer 26 is curved relative to the track width direction instead of being planar as in the conventional case, angles are eliminated between side faces and the tip surface 26c, and thus flux leakage between the upper core layer 26 and the upper pole layer 35 can be further decreased, and side fringing can be further suppressed.

Since the tip surface 26c of the upper core layer 26 has a curvature relative to the track width direction, even if the position of the upper core layer 26 to be formed on the upper pole layer 35 is slightly deviated in the track width direction (in the X direction) on the upper pole layer 35, it is possible to reduce the influence of side fringing in comparison with the case in which the tip surface 26c is planar relative to the track width direction. Therefore, it is possible to fabricate a thin-film magnetic head in which side fringing can be appropriately suppressed even if the alignment accuracy of the upper core layer 26 to the upper pole layer 35 is slightly decreased.

In the present invention, when a tangent touching each end 26e of the curvature in the track width direction is considered (shown as a phantom line E), preferably, the inclination angle $\theta 4$ of the phantom line E relative to the track width direction (the X direction) is about 30° to about 60°. By setting the inclination angle $\theta 4$ at 30° to 60°, the transfer efficiency of flux flowing from the upper core layer 26 to the upper pole layer 35 is not decreased, and even if the tip surface 26c of the upper core layer 26 substantially corresponds to the surface facing the recording medium, it is possible to reduce the side fringing from the tip surface 26c to substantially zero.

As further shown in FIG. 3, the upper core layer 26 extends in the height direction from the end 26e of the curved tip surface 26c and includes a front region F in which the width in the track width direction is uniform and a back region G in which the width in the track width direction gradually increases from the end on the height side of the front region F in the height direction (in the Y direction in the drawing). However, the present invention is not limited to this shape. For example, the front region F may be formed so that the width increases in the height direction along the phantom line E.

As described above, in the thin-film magnetic head shown in FIGS. 1 and 2, the tip 26a of the upper core layer 26 is set back from the surface facing the recording medium in the height direction (in the Y direction), and the tip surface 26c of the upper core layer 26 is an inclined surface or a curved surface in which the depth gradually increases from the lower core layer side to the upper core layer side (in the Z direction in the drawing), and also the tip surface 26c has a curvature which gradually recedes in the height direction toward both sides in the track width direction. Also, as shown in FIG. 1, the width of the upper core layer 26 at the edge in which the upper core layer 26 is connected to the upper pole layer 35 is greater than the width in the track width direction of the upper pole layer 35. Consequently, it is possible to efficiently apply the flux from the upper core layer 26 to the upper pole layer 35, and thus recording characteristics can be improved.

In the present invention, in the section in which the upper core layer 26 overlaps the recording core 24, preferably, the width in the track width direction of the upper core layer 26 is approximately 2 to 2.5 times the width in the track width direction of the recording core 24. By setting the widths to satisfy the above relationship, when the upper core layer 26 is formed on the recording core 24, the upper surface of the recording core 24 securely and easily overlaps the upper core layer 26 within the width of the upper core layer 26, and also the flux from the upper core layer 26 can be efficiently applied to the upper pole layer 35.

As shown in FIG. 3, the recording core 24 (formed of three layers consisting of the lower pole layer 21, the gap layer 22, and the upper pole layer 35, or formed of two layers consisting of the gap layer 22 and the upper pole layer 35), includes a front region C, which extends from the surface facing the recording medium in the height direction (in the Y direction in the drawing) with the track width Tw, and a back region D in which the width in the track width direction gradually increases from the end on the height side of the front region C in the height direction. Since the recording core 24 is provided with the back region D in which the width is greater than the track width Tw, it is possible to increase the contact area with the upper core layer 26, and the flux from the upper core layer 26 can be efficiently applied to the upper pole layer 35. Consequently, preferably, the upper core layer 26 formed on the recording core 24 is connected to at least the back region D of the recording core 24, and thus the contact area between the upper core layer 26 and the recording core 24 can be increased.

In the present invention, the length L4 of the front region C, which is formed with the track width Tw, satisfies the relationship about 0.2 μm<L4≦about 3.0 μm. If the length L4 is below the above range, since the length of the front region C of the recording core 24 becomes too short, it is difficult to define the width of the recording core 24, which is exposed at the surface facing the recording medium, at the predetermined track width Tw. If the length L4 is greater than about 3.0 μm, the upper core layer 26 does not easily overlap the back region D of the upper pole layer 35, and since the overlap between the upper core layer 26 and the front region C of the upper pole layer 35 increases, it is not possible to exploit the advantage that the contact area between the upper core layer 26 and the upper pole layer 35 is increased.

FIG. 4 is a partial plan view showing another shape of the thin-film magnetic head in accordance with the present invention. As shown in FIG. 4, the recording core 24 is formed with the track width Tw and with a predetermined length L5 from the surface facing the recording medium in the height direction (in the Y direction in the drawing). That is, in the example shown in FIG. 4, the back region D in which the width is greater than the track width Tw, as is the case in the example shown in FIG. 3, is not formed.

In the shape of the recording core 24 shown in FIG. 4, although the contact area with the upper core layer 26 is decreased in comparison with the recording core 24 shown in FIG. 3, it is possible to appropriately define the track width Tw, which is advantageous.

Additionally, the length L5 of the recording core 24 is preferably set so as to satisfy the relationship about 0.8 μm≦L5≦about 6.0 μm. When the length L5 is about 0.8 μm or more, since the contact area between the upper core layer 26 and the upper pole layer 35 is sufficiently large, the transfer efficiency of flux flowing from the upper core layer 26 to the upper pole layer 35 is not decreased. If the length L5 is greater than about 6.0 μm, when the recording core 24 is grown by plating, it is not possible to uniformly form the individual layers, and the thickness may taper at the interior end, or the layers may be curved, resulting in an increase in variations in the magnetic gap and the gap depth Gd, which is disadvantageous.

In the example shown in FIG. 4, the same as the example shown in FIG. 3, the width in the track width direction of the upper core layer 26 at the edge in which the upper core layer 26 is connected to the upper pole layer 35 is greater than the width in the track width direction of the upper pole layer 35. Consequently, the flux from the upper core layer 26 can be efficiently applied to the upper pole layer 35.

In the example shown in FIG. 4, the overlapping ratio between the upper core layer 26 and the recording core 24 and the shape of the upper core layer 26 are the same as those in the example shown in FIG. 3.

Figure 5:
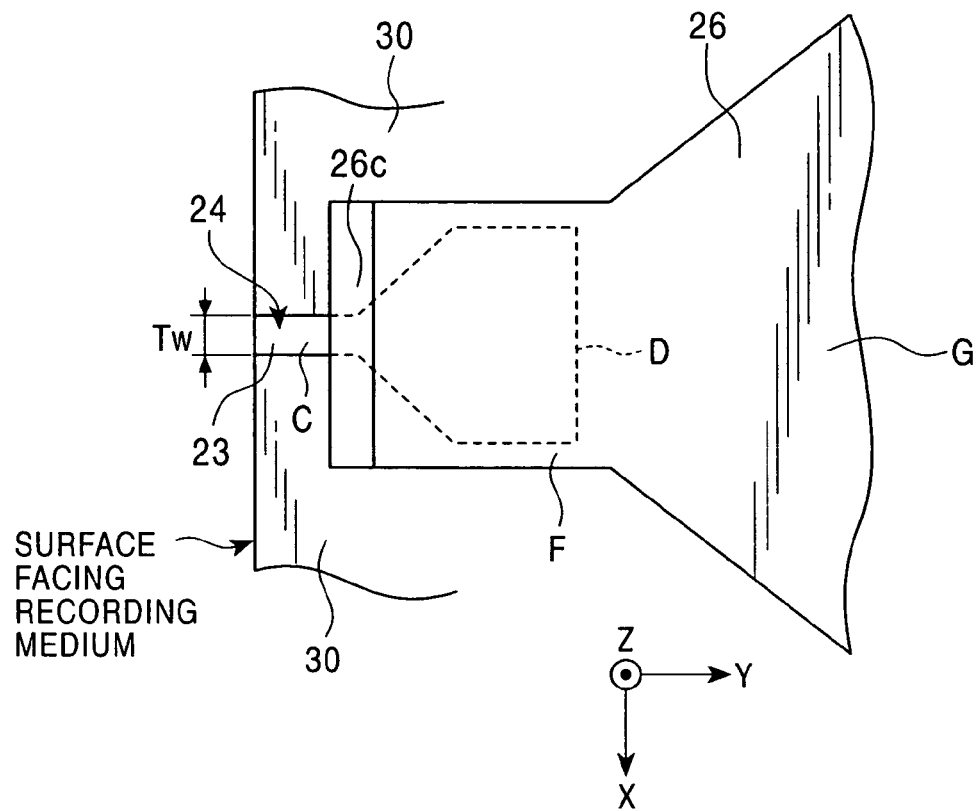
FIG. 5 is a partial plan view showing another shape of the thin-film magnetic head shown in FIGS. 1 and 2.
Figure 6:
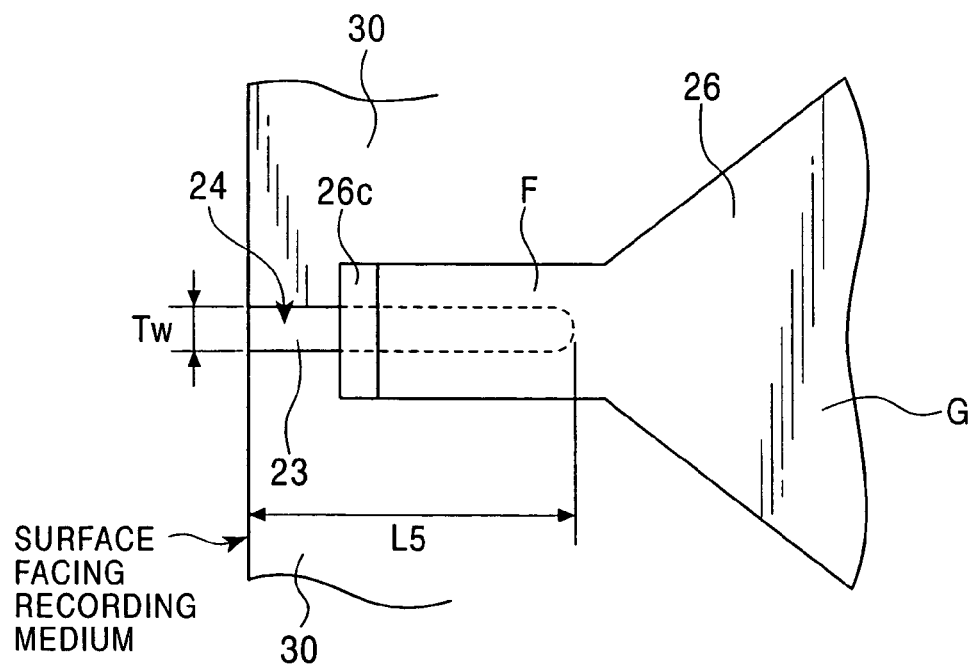
FIG. 6 is a partial plan view showing another shape of the thin-film magnetic head shown in FIGS. 1 and 2.

FIGS. 5 and 6 are partial plan views showing other examples of thin-film magnetic heads in accordance with the present invention. In a thin-film magnetic head shown in FIG. 5, in the same manner as that in the thin-film magnetic head shown in FIG. 3, an upper core layer 26 is set back from a surface facing a recording medium in the height direction (in the Y direction in the drawing), and a tip surface 26c of the upper core layer 26 is not exposed at the surface facing the recording medium. A protective layer 34 as shown in FIG. 2 is filled in a space between the surface facing the recording medium and the tip surface 26c of the upper core layer 26.

In the thin-film magnetic head shown in FIG. 5, in similarity with the thin-film magnetic head shown in FIG. 2, the tip surface 26c is an inclined surface or a curved surface in which the depth in the height direction (in the Y direction) gradually increases from the lower core layer side to the upper core layer side.

By setting the upper core layer 26 back from the surface facing the recording medium in the height direction and by forming the tip surface 26c into an inclined surface or a curved surface in which the depth in the height direction gradually increases from the lower core layer side to the upper core layer side, it is possible to appropriately suppress side fringing between the upper core layer 26 and an upper pole layer 35, and the flux from the upper core layer 26 can be efficiently applied to the upper pole layer 35, and also the space between the tip surface 26c of the upper core layer 26 and the surface facing the recording medium can be completely filled with the protective layer 34 without a cavity.

Additionally, in the example shown in FIG. 5, the tip surface 26c does not have a curvature which gradually recedes in the height direction toward both sides in the track width direction as in the embodiments illustrated in FIGS. 3 or 4, and the tip surface 26c has a planar shape which extends parallel to the track width direction (the X direction).

As described above, although the tip surface 26c of the upper core layer 26 has the planar shape in the track width direction, since the tip surface 26c is set back from the surface facing the recording medium in the height direction (in the Y direction in the drawing), the tip surface 26c is not exposed at the surface facing the recording medium, thus providing a structure which is effective in suppressing side fringing. Additionally, in the example shown in FIG. 5, the shape of a recording core 24 formed under the upper core layer 26 has the same shape as that of the recording core 24 shown in FIG. 3. That is, the recording core 24 includes a front region C which extends from the surface facing the recording medium in the height direction (in the Y direction) with the track width Tw, and a back region D in which the width in the track width direction gradually increases from the end on the height side of the front region C in the height direction. Since the recording core 24 is provided with the back region D in which the width gradually increases from the track width Tw, it is possible to increase the contact area between the upper pole layer 35 and the upper core layer 26.

As shown in FIG. 5, since the width in the track width direction of the upper core layer 26 at the edge in which the upper core layer 26 is connected to the upper pole layer 35 is greater than the width in the track width direction of the upper pole layer 35, the flux from the upper core layer 26 can be efficiently applied to the upper pole layer 35, thus improving the recording characteristics.

In a thin-film magnetic head shown in FIG. 6, in the same manner as that in the thin-film magnetic head shown in FIG. 5, an upper core layer 26 is set back from a surface facing a recording medium in the height direction, and also a tip surface 26c of the upper core layer 26 is an inclined surface or a curved surface in which the depth in the height direction gradually increases from the lower core layer side to the upper core layer side.

Consequently, it is possible to reduce side fringing in comparison with the conventional thin-film magnetic head, and a space between the surface facing the recording medium and the tip surface 26c of the upper core layer 26 can be appropriately filled with a protective layer 34, and also the flux from the upper core layer 26 can be efficiently applied to the upper pole layer 35.

In this example, the same as the example shown in FIG. 5, although the tip surface 26c of the upper core layer 26 has a planar shape parallel to the track width direction, since the tip surface 26c is set back from the surface facing the recording medium in the height direction, it is possible to reduce side fringing in comparison with the conventional case.

In the example shown in FIG. 6, a recording core 24 is formed with a track width and with a predetermined length L5 from the surface facing the recording medium in the height direction. When the width of the recording core 24 is set to be the track width Tw as described above, the track width Tw is easily defined within a predetermined size.

In this example, as shown in FIG. 6, the width in the track width direction of the upper core layer 26 at the edge in which the upper core layer 26 is connected to the upper pole layer 35 is greater than the width in the track width direction of the upper pole layer 35. Consequently, the flux from the upper core layer 26 can be efficiently applied to the upper pole layer 35, thus improving the recording characteristics.

In FIG. 5 or 6, the upper core layer 26 includes a front region F with a uniform width and a back region G in which the width in the track width direction gradually increases from the end on the height side of the front region F in the height direction.

However, the present invention is not limited to this shape. For example, the front region F may be formed so that the width gradually increases in the height direction.

Figure 7:
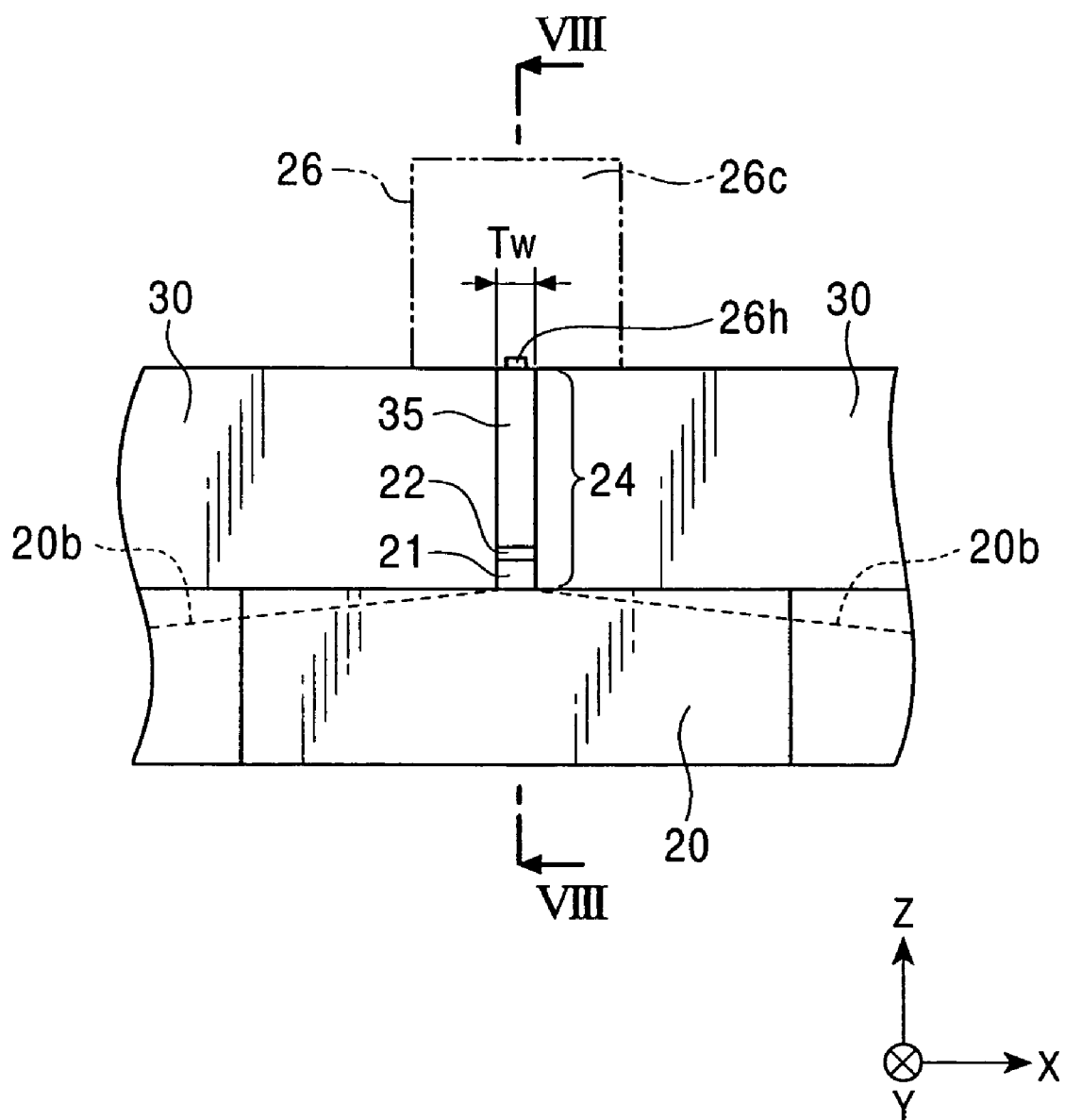
FIG. 7 is a partial front view of a thin-film magnetic head in accordance with another embodiment of the present invention.
Figure 8:
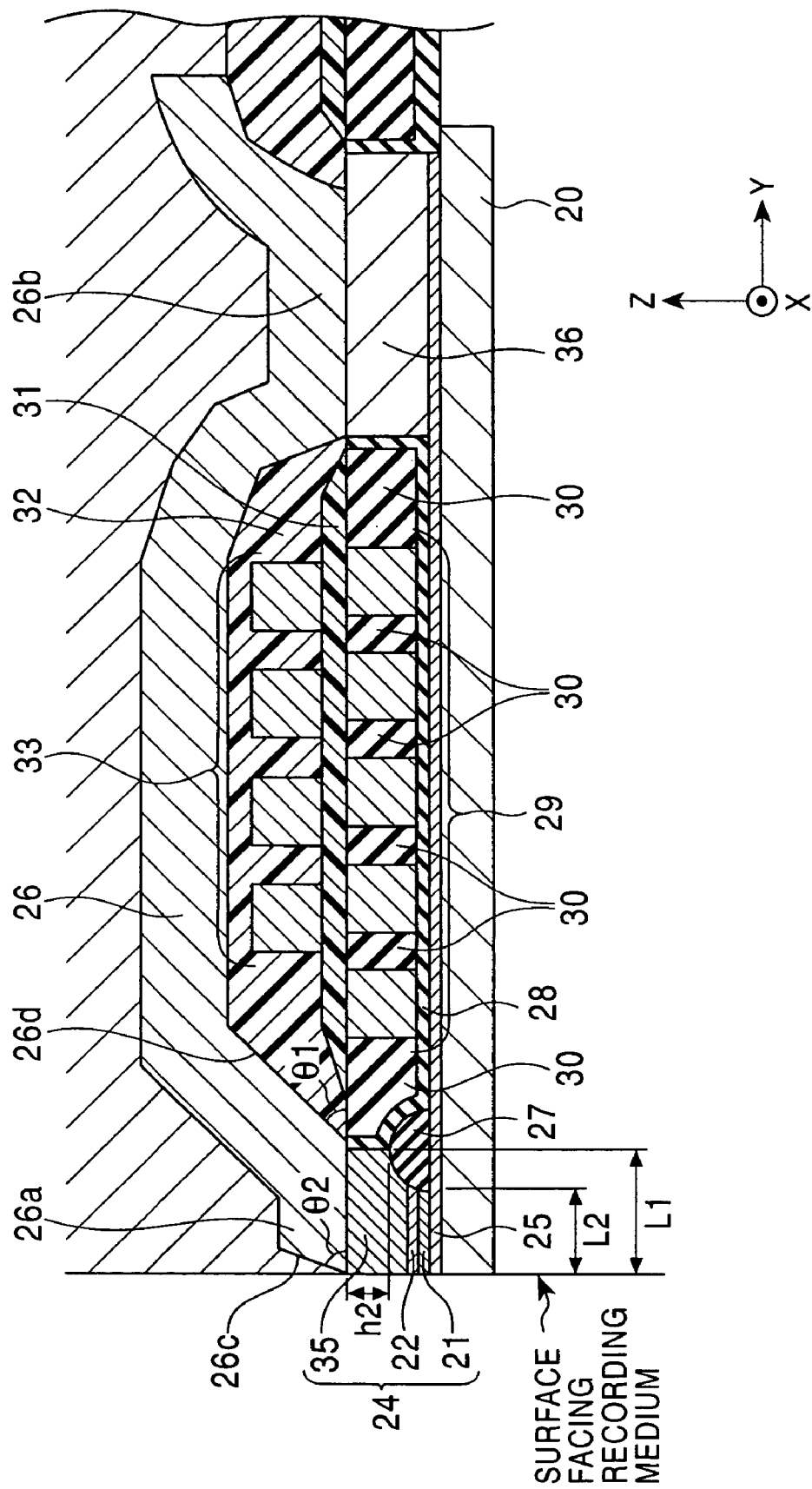
FIG. 8 is a partial cross-sectional view taken along the line VIII—VIII of FIG. 7.
Figure 9:
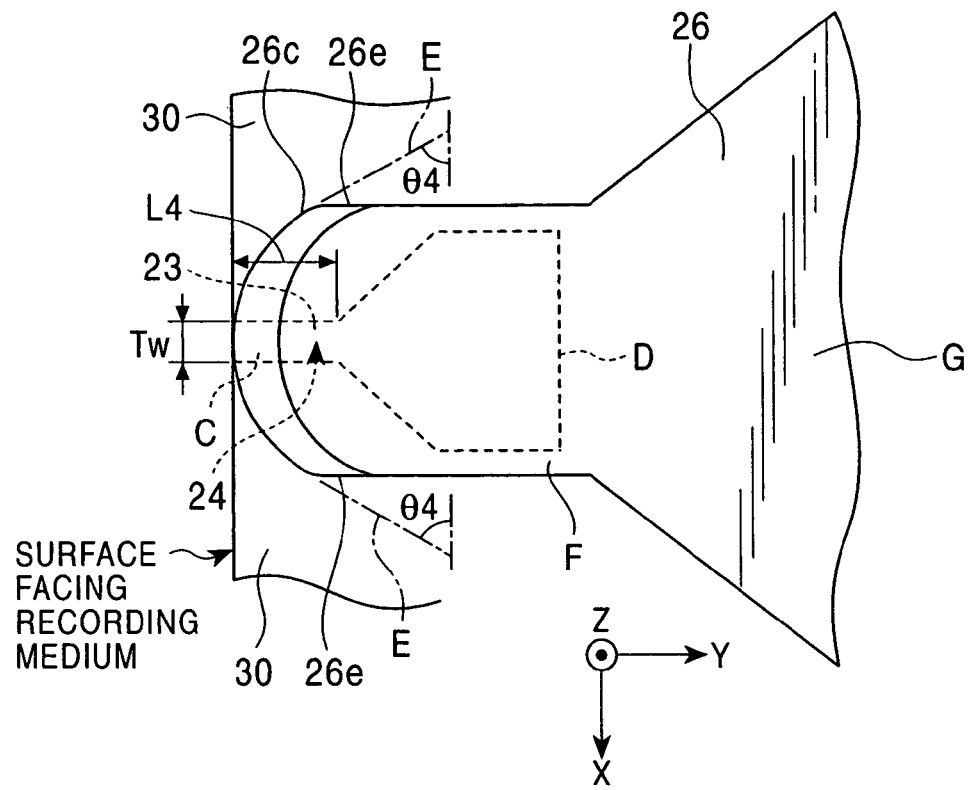
FIG. 9 is a partial plan view of the thin-film magnetic head shown in FIGS. 7 and 8.
Figure 10:
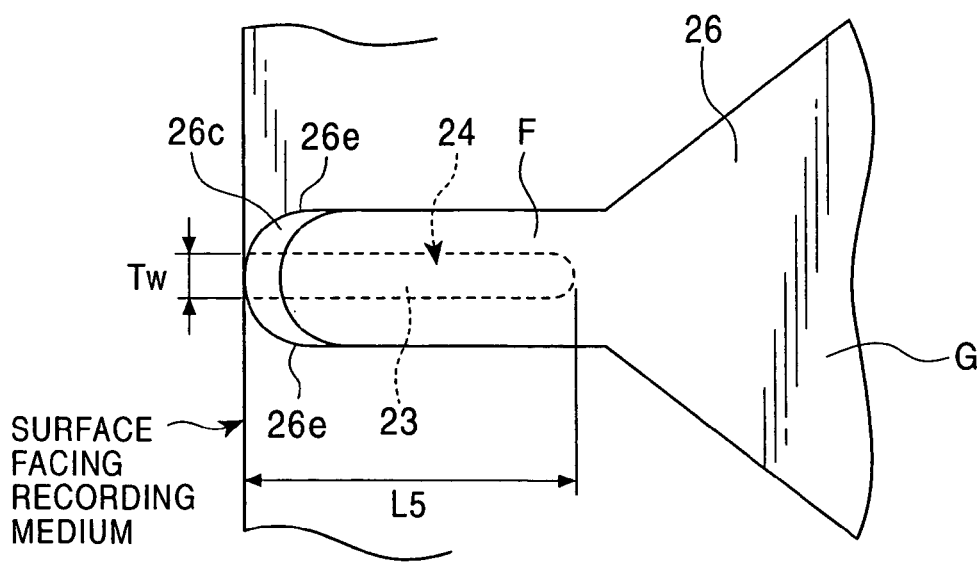
FIG. 10 is a partial plan view showing another shape of the thin-film magnetic head shown in FIGS. 7 and 8.

FIG. 7 is a partial front view of a thin-film magnetic head in another embodiment of the present invention, FIG. 8 is a partial cross-sectional view taken along the line VIII—VIII of FIG. 7, and FIGS. 9 and 10 are partial plan views of examples of thin-film magnetic heads.

In the thin-film magnetic heads shown in FIGS. 7 to 10, although the shapes of upper core layers 26 are different from the shapes of the upper core layers 26 in the thin-film magnetic heads shown in FIGS. 1 to 6, sections other than those are the same. That is, as shown in FIG. 8, a recording core 24, which extends from a surface facing a recording medium in the height direction with a predetermined length L1, is formed on a lower core layer 20, and the recording core 24 is a three-layered film including a lower pole layer 21, a gap layer 22, and an upper pole layer 35, or is a two-layered film including a gap layer 22 and an upper pole layer 35. A Gd-setting insulating layer 27 is formed between the lower core layer 20 and the recording core 24, and the length L2 from the surface facing the recording medium to the front surface of the Gd-setting insulating layer 27 is defined as a gap depth (Gd).

As shown in FIG. 8, a coil layer 29 is spirally patterned over the lower core layer 20 at the back of the recording core 24 in the height direction with the plating layer 25 and an insulating underlayer 28 therebetween. The spaces between individual conducting sections of the coil layer 29 are filled with an insulating layer 30 composed of an inorganic insulating material or the like, and the insulating layer 30 is exposed at the surface facing the recording medium as shown in FIG. 7.

An insulating layer 31 composed of an organic insulating material or the like is formed on the coil layer 29, and a second coil layer 33 is spirally patterned on the insulating layer 31. The second coil layer 33 is covered by an insulating layer 32 composed of an organic insulating material or the like, and an upper core layer 26 is patterned on the insulating layer 32, for example, by frame plating. A tip 26a of the upper core layer 26 overlies the upper pole layer 35, and the upper core layer 26 and the upper pole layer 35 are magnetically coupled to each other. A base 26b of the upper core layer 26 is magnetically coupled to an elevating layer 36 composed of a magnetic material formed on the lower core layer 20.

In this embodiment, the upper core layer 26 is not set back from the surface facing the recording medium in the height direction in contrast to the embodiments shown in FIGS. 1 to 6. A tip surface 26c of the upper core layer 26 extends to the surface facing the recording medium, and a portion thereof is positioned at the surface facing the recording medium.

As shown in FIG. 8, the tip surface 26c is an inclined surface or a curved surface in which the depth in the height direction (in the Y direction in the drawing) gradually increases from the lower core layer side to the upper core layer side (in the Z direction in the drawing).

As shown in FIG. 8, a back surface 26d located at the back of the tip surface 26c is an inclined surface or a curved surface in which the depth in the height direction gradually increases from the lower core layer side to the upper core layer side. Preferably, an inclination angle θ2 is greater than an inclination angle θ1, where angle θ1 is the inclination of the back surface 26d relative to the height direction (or the inclination of the tangent at the midpoint between the end of the curved surface on the lower core layer side and the end of the curved surface on the upper core layer side relative to the height direction), and angle θ2 is the inclination of the tip surface 26c relative to the height direction.

By setting the inclination angle θ2 of the tip surface 26c greater than the inclination angle θ1 of the back surface 26d as described above, it is possible to prevent the tip 26a of the upper core layer 26 from tapering, the volume of the tip 26a can be effectively increased, and the flux from the upper core layer 26 can be efficiently applied to the upper pole layer 35, thus improving the recording characteristics.

In the present invention, more preferably, the inclination angle θ2 of the tip surface 26c satisfies the relationship about 60°≦θ2<about 90°. If the inclination angle θ2 is less than about 60°, the tip 26a of the upper core layer 26 is easily tapered and the volume of the tip 26a decreases, and thus the transfer efficiency of flux flowing from the upper core layer 26 to the upper pole layer 35 is easily decreased.

Since the tip surface 26c is an inclined surface or a curved surface in which the depth in the height direction (in the Y direction) gradually increases from the lower core layer side to the upper core layer side, in combination with the curvature in the track width direction (in the X direction) of the tip surface 26c, which will be described below, it is possible to appropriately suppress side fringing.

As shown in FIG. 9, the tip surface 26c of the upper core layer 26 has a curvature which gradually recedes in the height direction toward both sides in the track width direction.

Since the tip surface 26c of the upper core layer 26 has the curvature which gradually recedes in the height direction toward both sides in the track width direction, only a portion 26h of the tip surface 26c of the upper core layer 26 is exposed at the surface facing the recording medium as shown in FIG. 7. That is, by forming the tip surface 26c of the upper core layer 26 so as to have a curvature which gradually recedes in the height direction toward both sides in the track width direction and so as to be an inclined surface or a curved surface in which the depth in the height direction gradually increases from the lower core layer side to the upper core layer side, only a slight portion of the tip surface 26c of the upper core layer 26 is exposed at the surface facing the recording medium. Consequently, it is possible to reduce flux leakage, and side fringing can be further reduced. Additionally, the portion 26h of the tip surface 26c, which is exposed at the surface facing the recording medium preferably has a width that is less than the track width Tw. Thereby, side fringing can be more appropriately suppressed.

Since the tip surface 26c of the upper core layer 26 has a curvature in the track width direction (in the X direction), even if the position of the upper core layer 26 to be formed on the upper pole layer 35 is slightly deviated in the track width direction (in the X direction) on the upper pole layer 35, it is possible to reduce the influence of side fringing in comparison with the case in which the tip surface 26c has a planar shape relative to the track width direction. Therefore, it is possible to fabricate a thin-film magnetic head in which side fringing can be appropriately suppressed even if the alignment accuracy of the upper core layer 26 to the upper pole layer 35 is slightly decreased.

In the present invention, when a tangent touching an end 26e of the curvature in the track width direction is considered (shown as a phantom line E), preferably, the inclination angle θ4 of the phantom line E relative to the track width direction (the X direction) is about 30° to about 60°. By setting the inclination angle θ4 at about 30° to about 60°, the transfer efficiency of flux flowing from the upper core layer 26 to the upper pole layer 35 is maintained, and even if the tip surface 26c of the upper core layer 26 is formed at substantially the same position as that of the surface facing the recording medium, it is possible to appropriately suppress the side fringing.

In the embodiment shown in FIG. 10, the same as the embodiment shown in FIG. 9, the tip surface 26c of the upper core layer 26 is an inclined surface or a curved surface in which the depth in the height direction gradually increases from the lower core layer side to the upper core layer side, and also the tip surface 26c has a curvature which gradually recedes in the height direction toward both sides in the track width direction.

The shape of the recording core 24 formed under the upper core layer 26 shown in FIG. 9 is different from the shape of the recording core 24 shown in FIG. 10. In the embodiment shown in FIG. 9, the recording core 24 includes a front region C, which extends from the surface facing the recording medium in the height direction with the track width Tw, and a back region D, in which the width in the track width direction gradually increases from the end on the height side of the front region C in the height direction. In the embodiment shown in FIG. 10, the recording core 24 extends from the surface facing the recording medium in the height direction with a predetermined length L5 with the track width Tw, and a back region D is not provided.

With respect to the shape of the recording core 24 shown in FIG. 9, although there is a possibility that the track width Tw becomes greater than the predetermined size if the length LA of the front region C, which is formed with the track width Tw, is too short, it is possible to increase the contact area between the recording core 24 and the upper core layer 26 due to the presence of the back region D. With respect to the shape of the recording core 24 shown in FIG. 10, although the contact area with the upper core layer 26 is decreased in comparison with the example shown in FIG. 9, the track width Tw is easily defined within the predetermined size.

The length L4 of the front region C in the recording core 24 shown in FIG. 9 preferably satisfies the relationship about $0.2\ \mu m < L4 \leq$ about $3.0\ \mu m$. The length L5 of the recording core 24 shown in FIG. 10 preferably satisfies the relationship about $0.8\ \mu m \leq L5 \leq$ about $6.0\ \mu m$. The reason for this is as described above.

As shown in FIG. 9 or 10, the width in the track width direction of the upper core layer 26 at the edge in which the upper core layer 26 is connected to the upper pole layer 35 is greater than the width in the track width direction of the upper pole layer 35. Consequently, the flux from the upper core layer 26 can be efficiently applied to the upper pole layer 35. Additionally, in the section in which the upper core layer 26 overlaps the recording core 24, preferably, the width in the track width direction of the upper core layer 26 is approximately 2 to 2.5 times the width in the track width direction of the recording core 24. The reason for this is as described above.

As shown in FIG. 9 or 10, the upper core layer 26 includes a front region F which extends from the surface facing the recording medium in the height direction (in the Y direction) with a predetermined width, and a back region G in which the width in the track width direction gradually increases from the end on the height side of the front region F in the height direction. However, the present invention is not limited to this shape. For example, the front region F may be formed so that the width gradually increases along the phantom line E.

Figure 11:
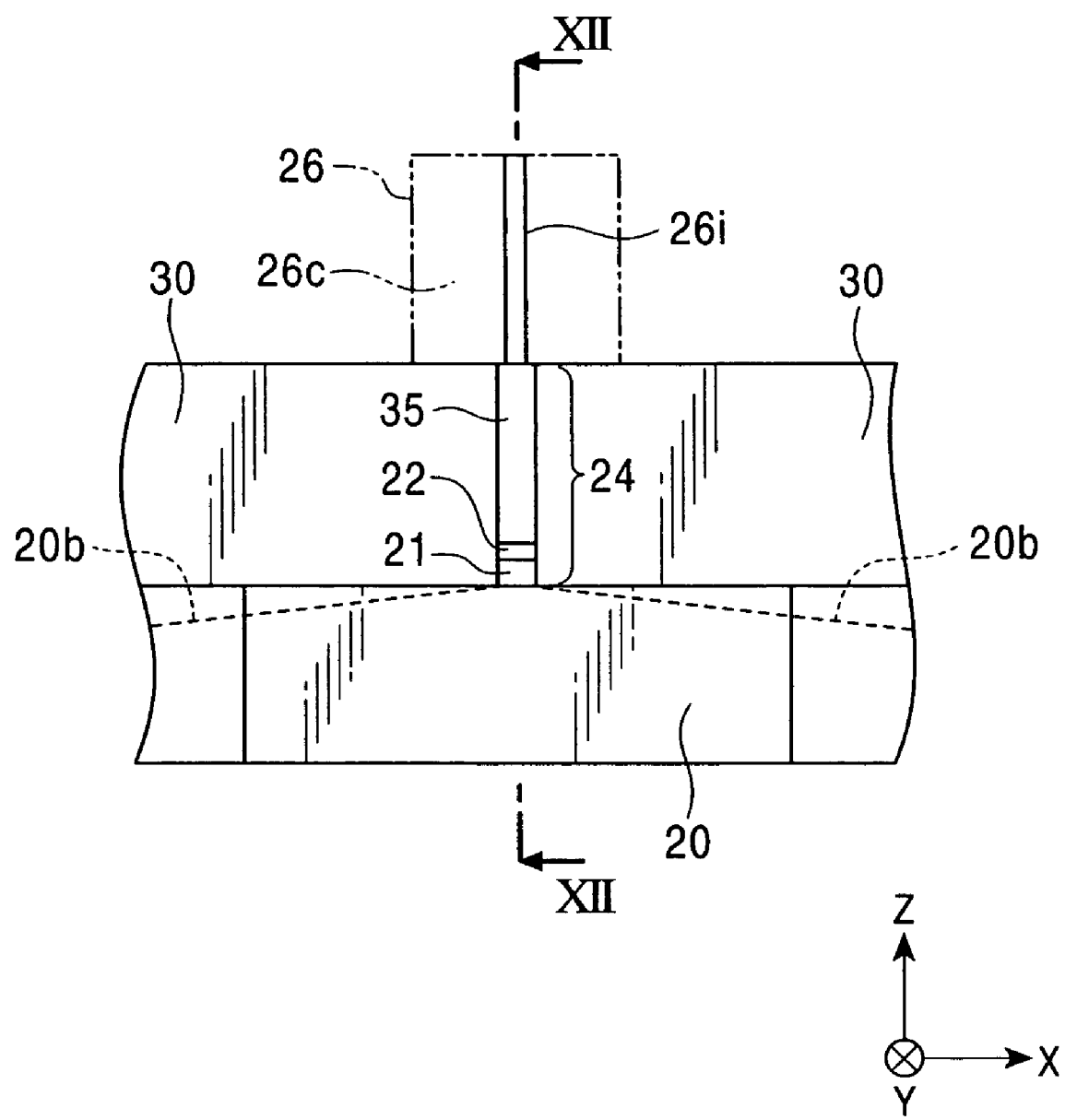
FIG. 11 is a partial front view of a thin-film magnetic head in accordance with another embodiment of the present invention.
Figure 12:
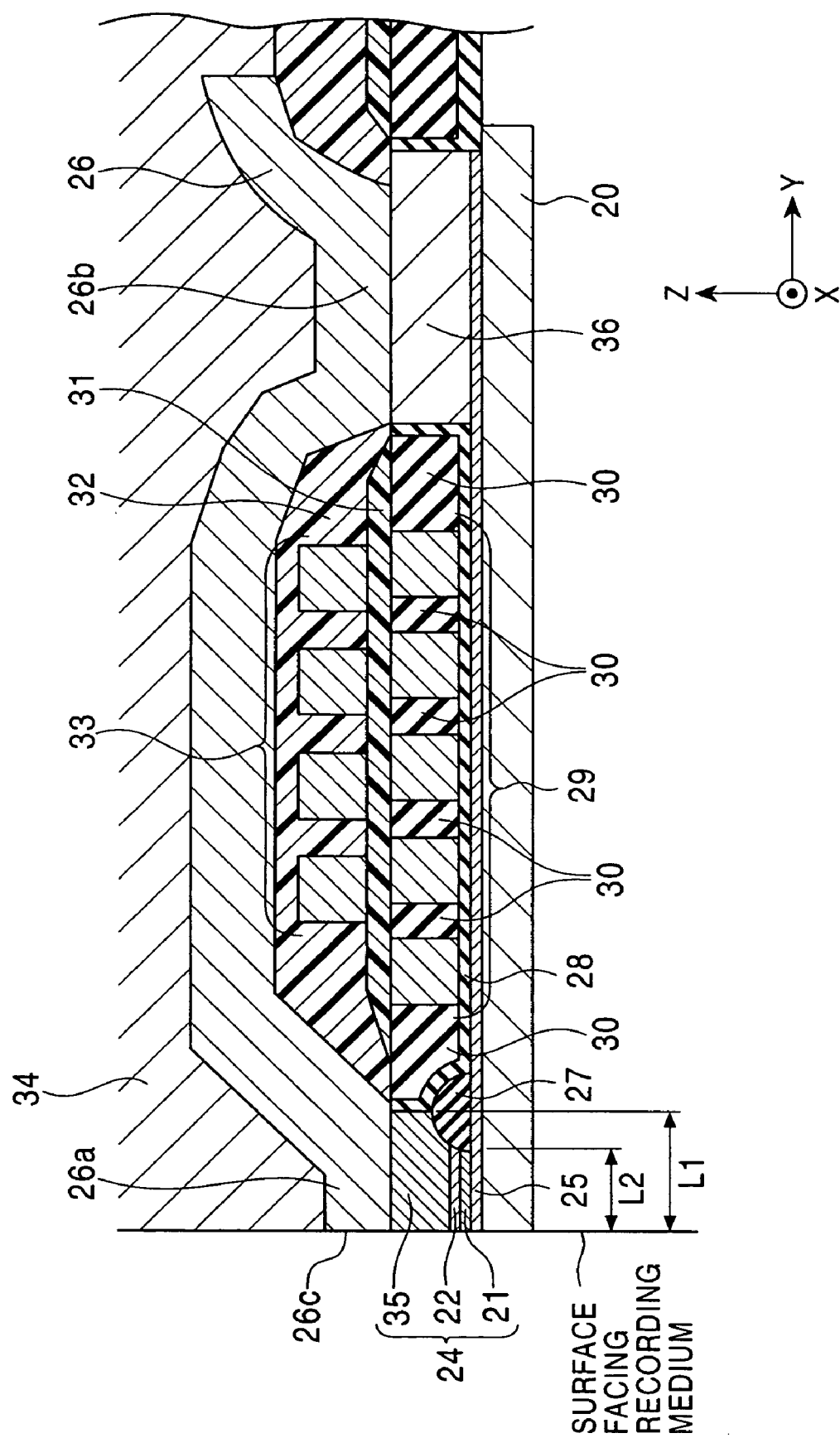
FIG. 12 is a partial sectional view taken along the line XII—XII of FIG. 11.
Figure 13:
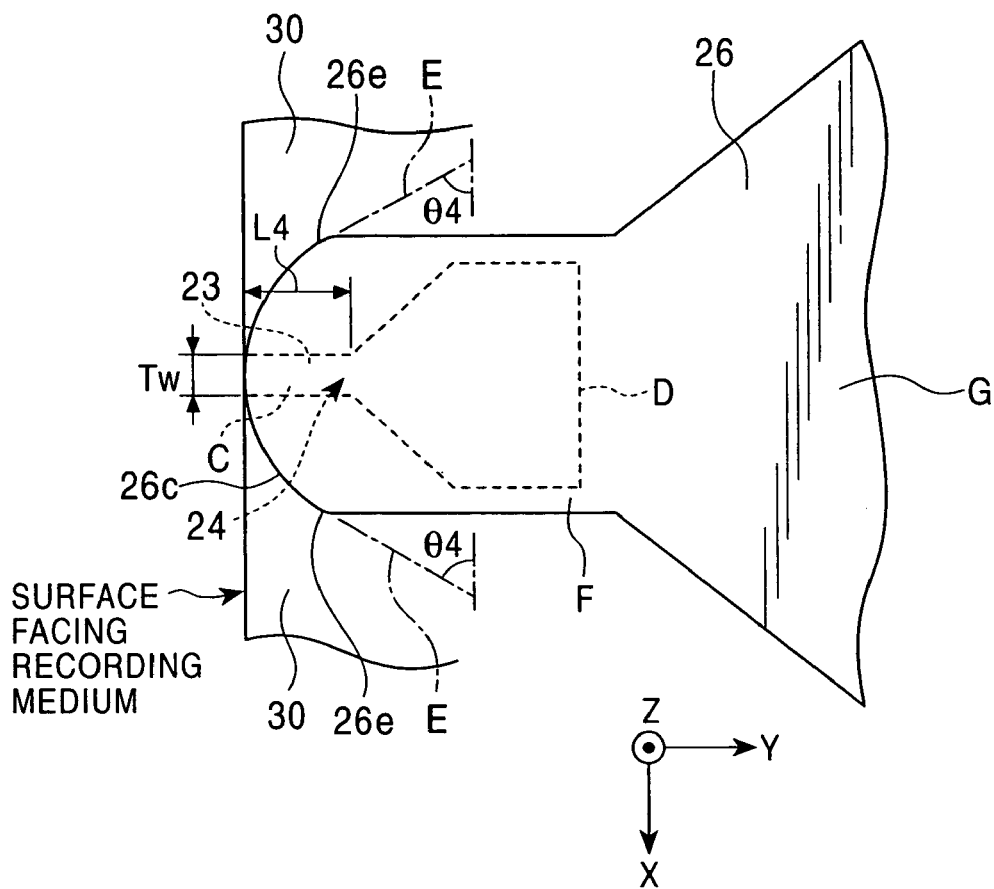
FIG. 13 is a partial plan view of the thin-film magnetic head shown in FIGS. 11 and 12.
Figure 14:
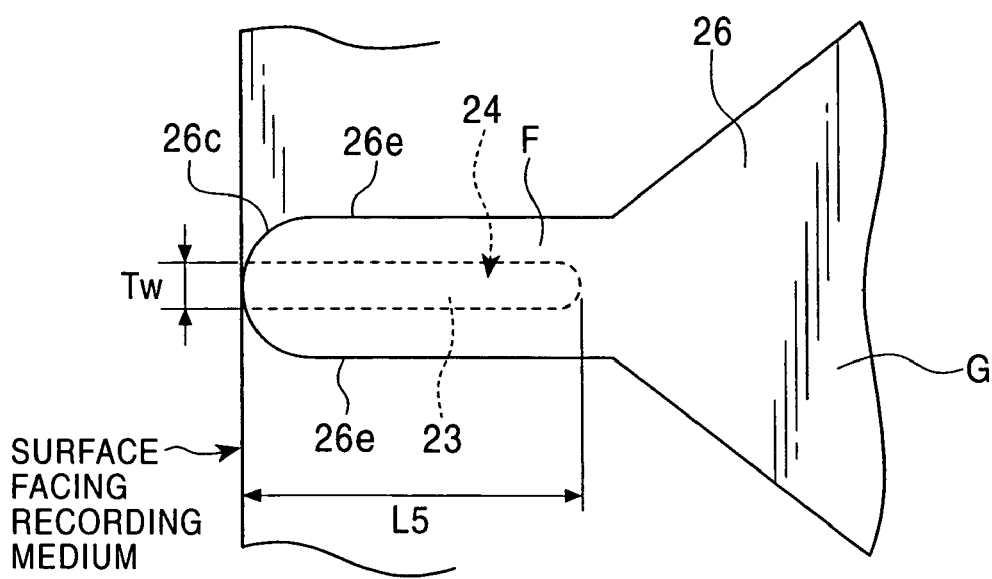
FIG. 14 is a partial plan view showing another shape of the thin-film magnetic head shown in FIGS. 11 and 12.

FIG. 11 is a partial front view of a thin-film magnetic head in accordance with another embodiment of the present invention. FIG. 12 is a partial cross-sectional view taken along the line XII—XII of FIG. 11, and FIGS. 13 and 14 are partial plan views of examples of thin-film magnetic heads. In the thin-film magnetic heads shown in FIGS. 11 to 14, although the shapes of upper core layers 26 are different from the shapes of the upper core layers 26 in the thin-film magnetic heads shown in FIGS. 1 to 6, sections other than those are the same.

As shown in FIG. 12, a recording core 24, which extends from a surface facing a recording medium in the height direction with a predetermined length L1, is formed on a lower core layer 20, and the recording core 24 is a three-layered film including a lower pole layer 21, a gap layer 22, and an upper pole layer 35 deposited in that order from the bottom, or is a two-layered film including the gap layer 22 and the upper pole layer 35. A Gd-setting insulating layer 27 is formed between the lower core layer 20 and the recording core 24, and the length L2 from the surface facing the recording medium to the front surface of the Gd-setting insulating layer 27 is defined as a gap depth (Gd).

As further shown in FIG. 12, a coil layer 29 is spirally patterned over the lower core layer 20 at the back of the recording core 24 in the height direction with the plating layer 25 and an insulating underlayer 28 therebetween. The spaces between individual conducting sections of the coil layer 29 are filled with an insulating layer 30 composed of an inorganic insulating material or the like, and the insulating layer 30 is exposed at the surface facing the recording medium as shown in FIG. 11. Additionally, as shown in FIG. 11, inclined planes 20b may be formed in the upper surface of the lower core layer 20. Thereby, side fringing can be suppressed more appropriately.

An insulating layer 31 composed of an organic insulating material or the like is formed on the coil layer 29, and a second coil layer 33 is spirally patterned on the insulating layer 31. The second coil layer 33 is covered by an insulating layer 32 composed of an organic insulating material or the like, and an upper core layer 26 is patterned on the insulating layer 32, for example, by frame plating. A tip 26a of the upper core layer 26 overlies the upper pole layer 35, and the upper core layer 26 and the upper pole layer 35 are magnetically coupled to each other. A base 26b of the upper core layer 26 is magnetically coupled to an elevating layer 36 composed of a magnetic material formed on the lower core layer 20.

In this embodiment, the upper core layer 26 is not set back from the surface facing the recording medium in the height direction in contrast to the embodiments shown in FIGS. 1 to 6. A tip surface 26c of the upper core layer 26 extends to the surface facing the recording medium, and a portion thereof is positioned at the surface facing the recording medium.

As shown in FIG. 13, the tip surface 26c has a curvature which gradually recedes in the height direction toward both sides in the track width direction. In this embodiment, the tip surface 26c is not an inclined surface or a curved surface in which the depth in the height direction gradually increases from the lower core layer side to the upper core layer side in contrast to the embodiments shown in FIGS. 1 to 6 and the embodiments shown in FIGS. 7 to 10, and the tip surface 26c is formed parallel to the surface facing the recording medium. Consequently, as shown in FIG. 11, a portion 26i, which has a uniform width from the side of the lower core layer to the side of the upper core layer, of the tip surface 26c of the upper core layer 26 is exposed at the surface facing the recording medium.

As described above, since the tip surface 26c of the upper core layer 26 has a curvature that gradually recedes in the height direction toward both sides in the track width direction, although the tip surface 26c is positioned at the surface facing the recording medium, the portion 26i is the only portion exposed at the surface facing the recording medium. In this structure, the tip surface 26c of the upper core layer 26 is slightly exposed at the surface facing the recording medium. Consequently, it is possible to reduce flux leakage between the upper core layer 26 and the upper pole layer 35, and side fringing can be further reduced. Additionally, the portion 26i of the tip surface 26c which is exposed at the surface facing the recording medium preferably has a width that is less than the track width Tw. Thereby, side fringing can be more appropriately suppressed.

Since the tip surface 26c of the upper core layer 26 has a curvature in the track width direction, even if the position of the upper core layer 26 to be formed on the upper pole layer 35 is slightly deviated in the track width direction (in the X direction) on the upper pole layer 35, it is possible to reduce the influence of side fringing in comparison with the case in which the tip surface 26c has a planar shape relative to the track width direction. Therefore, it is possible to fabricate a thin-film magnetic head in which side fringing can be appropriately suppressed even if the alignment accuracy of the upper core layer 26 to the upper pole layer 35 is slightly decreased.

In the present invention, when a tangent touching an end 26e of the curved tip surface 26c is considered (shown as a phantom line E), preferably, the inclination angle θ4 of the phantom line E relative to the track width direction (the X direction) is about 30° to about 60°. By setting the inclination about θ4 at about 30° to about 60°, the transfer efficiency of flux flowing from the upper core layer 26 to the upper pole layer 35 is maintained, and even if the tip surface 26c of the upper core layer 26 is formed at substantially the same position as that of the surface facing the recording medium, it is possible to appropriately suppress the side fringing.

In the embodiment shown in FIG. 14, in similarity with the embodiment shown in FIG. 13, the tip surface 26c has a curvature which gradually recedes in the height direction toward both sides in the track width direction. The tip surface 26c is not an inclined surface or a curved surface in which the depth in the height direction gradually increases from the lower core layer side to the upper core layer side in contrast to the embodiments shown in FIGS. 1 to 6 and the embodiments shown in FIGS. 7 to 10.

The shape of the recording core 24 formed under the upper core layer 26 shown in FIG. 13 is different from the shape of the recording core 24 shown in FIG. 14. In the embodiment shown in FIG. 13, the recording core 24 includes a front region C, which extends from the surface facing the, recording medium in the height direction with the track width Tw, and a back region D, in which the width in the track width direction gradually increases from the end edge on the height side of the front region C in the height direction. In the embodiment shown in FIG. 14, the recording core 24 extends from the surface facing the recording medium in the height direction with a predetermined length L5 with the track width Tw, and a back region D is not provided.

With respect to the shape of the recording core 24 shown in FIG. 13, although there is a possibility that the track width Tw becomes greater than the predetermined size if the length L4 of the front region C, which is formed with the track width Tw, is too short, it is possible to increase the contact area between the recording core 24 and the upper core layer 26 due to the presence of the back region D. With respect to the shape of the recording core 24 shown in FIG. 14, although the contact area with the upper core layer 26 is decreased in comparison with the example shown in FIG. 13, the track width Tw is easily defined within the predetermined size.

The length L4 of the front region C in the recording core 24 shown in FIG. 13 preferably satisfies the relationship about 0.2 μm<L4≦about 3.0 μm. The length L5 of the recording core 24 shown in FIG. 14 preferably satisfies the relationship about 0.8 μm≦L5≦about 6.0 μm. The reason for this is as described above.

As shown in FIGS. 13 and 14, the width in the track width direction of the upper core layer 26 at the edge in which the upper core layer 26 is connected to the upper pole layer 35 is greater than the width in the track width direction of the upper pole layer 35. Consequently, the flux from the upper core layer 26 can be efficiently applied to the upper pole layer 35. In the section in which the upper core layer 26 overlaps the recording core 24, preferably, the width in the track width direction of the upper core layer 26 is approximately 2 to 2.5 times the width in the track width direction of the recording core 24. The reason for this is as described above.

As shown in FIG. 13 or 14, the upper core layer 26 includes a front region F that extends from the surface facing the recording medium in the height direction with a predetermined width, and a back region G, in which the width in the track width direction gradually increases from the end edge on the height side of the front region F in the height direction. However, the present invention is not limited to this shape. For example, the front region F may be formed so that the width gradually increases along the phantom line E.

As described above, in accordance with the thin-film magnetic heads of the present invention, it is possible to suppress the side fringing in comparison with the conventional case, the flux from the upper core layer 26 can be efficiently applied to the upper pole layer 35, and thus it is possible to fabricate a thin-film magnetic head which is suitable for an increased recording density.

Next, a method for fabricating a thin-film magnetic head in the present invention will be described with reference to the drawings. FIGS. 15A and 15B to FIG. 21 shows the steps for fabricating thin-film magnetic heads shown in FIGS. 1 to 4. FIGS. 15A, 16A, 17A, and 18A are partial front views and FIGS. 15B, 16B, 17B, and 18B are corresponding partial cross-sectional views.

Figure 15A:
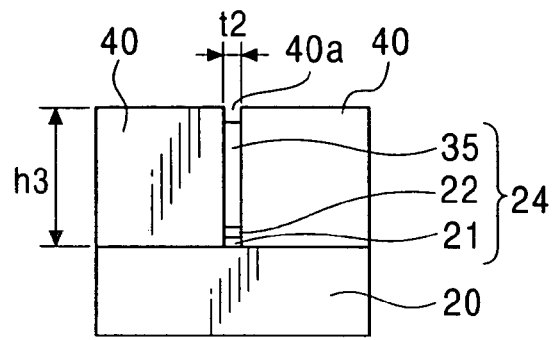
FIGS. 15A and 15B are a partial front view and a partial sectional view, respectively, showing a step in accordance with a method for fabricating a thin-film magnetic head of the present invention.
Figure 15B:
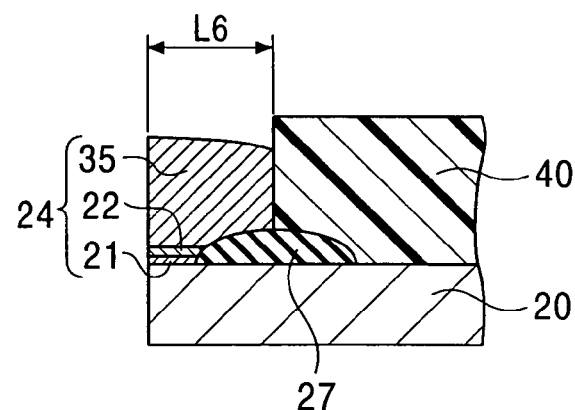

Referring to FIGS. 15A and 15B, first, a Gd-setting insulating layer 27 is formed on a lower core layer 20 as shown in FIG. 15B, and then a resist layer 40 with a height h3 is formed on the lower core layer 20. The height h3 is set, for example, at approximately 4.0 μm.

Next, a groove 40a is formed in the resist layer 40 by exposure and development with a predetermined length L6 from a surface facing a recording medium in the height direction. The width t2 of the groove 40a is set, for example, at approximately 0.45 μm. Additionally, since the width t2 is defined as the track width Tw, the width t2 is preferably set to be as small as possible, for example, at the threshold value of the i-line which is used for exposure.

As shown in FIG. 15A, a lower pole layer 21, a gap layer 22, and an upper pole layer 35 are deposited in that order from the bottom in the groove 40a by continuous plating. In order to perform such continuous plating, the gap layer 22 must be formed using a nonmagnetic metallic material for plating. Specifically, the nonmagnetic metallic material is preferably at least one material selected from the group consisting of NiP, NiPd, NiW, NiMo, Au, Pt, Rh, Pd, Ru, and Cr.

The three-layered film formed in the groove 40a constitutes a recording core 24. Additionally, the recording core 24 is not limited to the three-layered film. For example, the recording core 24 may consist of the gap layer 22 and the upper pole layer 35.

Figure 16A:
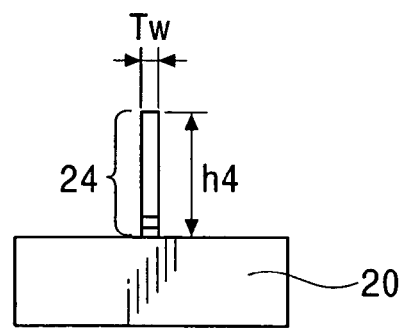
FIGS. 16A and 16B are a partial front view and a partial sectional view, respectively, showing a step in accordance with the invention carried out subsequent to the step shown in FIGS. 15A and 15B.
Figure 16B:
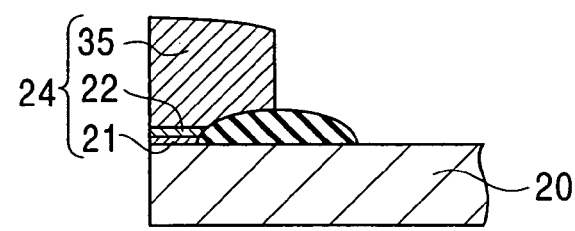

The resist layer 40 is then removed. FIGS. 16A and 16B show a stage in which the resist layer 40 has been removed.

The width of the recording core 24 formed on the lower core layer 20 is defined as the track width Tw, and the track width Tw is preferably about 0.7 µm or less, and more preferably about 0.5 µm or less.

The height h4 of the recording core 24 preferably satisfies the relationship about 1 µm≦h4≦about 4 µm. For example, the lower pole layer 21 has a height of approximately about 0.3 µm, the gap layer 22 has a height of approximately about 0.2 µm, and the upper pole layer 35 has a height of approximately about 3.0 to about 3.3 µm.

Figure 17A:
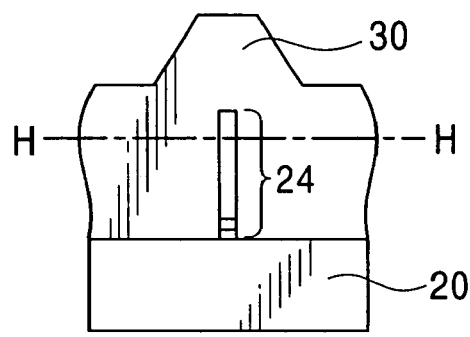
FIGS. 17A and 17B are a partial front view and a partial sectional view, respectively, showing a step in accordance with the invention carried out subsequent to the step shown in FIGS. 16A and 16B.
Figure 17B:
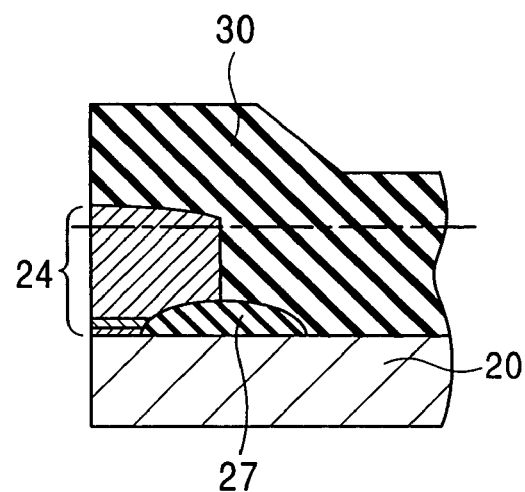

Next, as shown in FIGS. 17A and 17B, an insulating layer 30 is formed on the lower core layer 20 so as to cover the recording core 24. The insulating layer 30 is preferably composed of an inorganic insulating material. Specifically, the inorganic insulating material is preferably at least one insulating material selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. By forming the insulating layer 30 with the inorganic insulating material, the surface of the insulating layer 30 is easily polished using a CMP technique, which is subsequently performed.

Figure 18A:
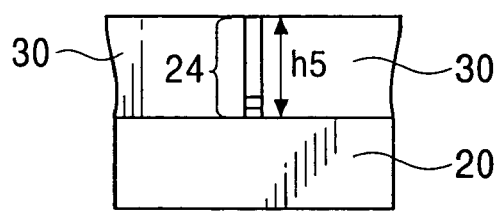
FIGS. 18A and 18B are a partial front view and a partial sectional view, respectively, showing a step in accordance with the invention carried out subsequent to the step shown in FIGS. 17A and 17B.
Figure 18B:
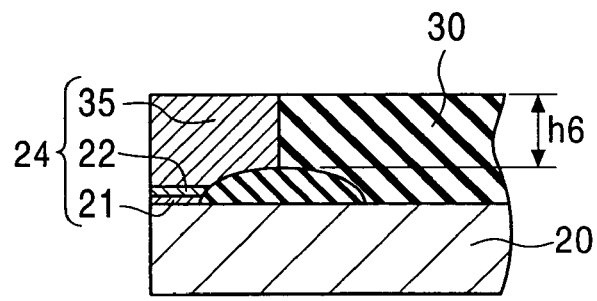

As shown in FIGS. 17A and 17B, the insulating layer 30 is polished using the CMP technique at the line H—H. Thereby, the surface of the insulating layer 30 is planarized, and the surface of the upper pole layer 35 is exposed from the insulating layer 30. FIGS. 18A and 18B insulating layer 30 and recording core 24 after polishing.

Since the surface of the recording core 24 is polished by the CMP technique in the step shown in FIGS. 17A and 17B, the recording core 24 has a height h5 as shown in FIG. 18A, and the height h5 is set, for example, at approximately 2.4 to 2.7 µm. As shown in FIG. 18B, the upper pole layer 35 on the Gd-setting insulating layer 27 has a height h6, and the height h6 is set at approximately 1.4 to 1.7 µm.

Figure 27:
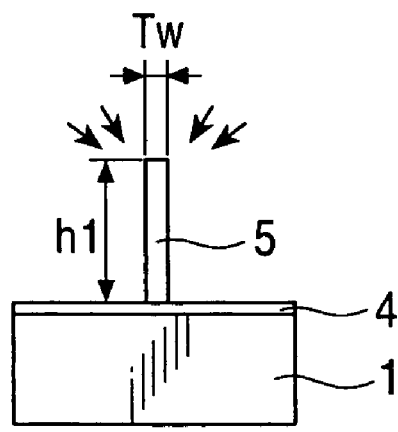
FIG. 27 is a partial front view showing a step carried out subsequent to the step shown in FIG. 26.
Figure 28:
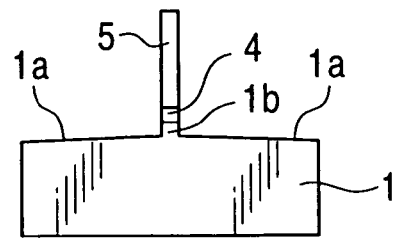
FIG. 28 is a partial front view showing a step carried out subsequent to the step shown in FIG. 27.
Figure 29:
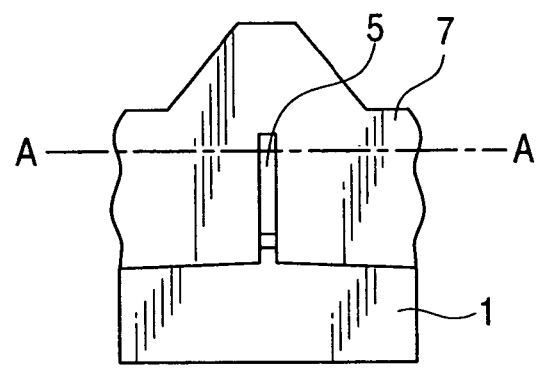
FIG. 29 is a partial front view showing a step carried out subsequent to the step shown in FIG. 28.
Figure 30:
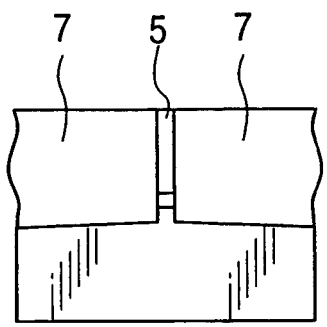
FIG. 30 is a partial front view showing a step carried out subsequent to the step shown in FIG. 29.
Figure 31:
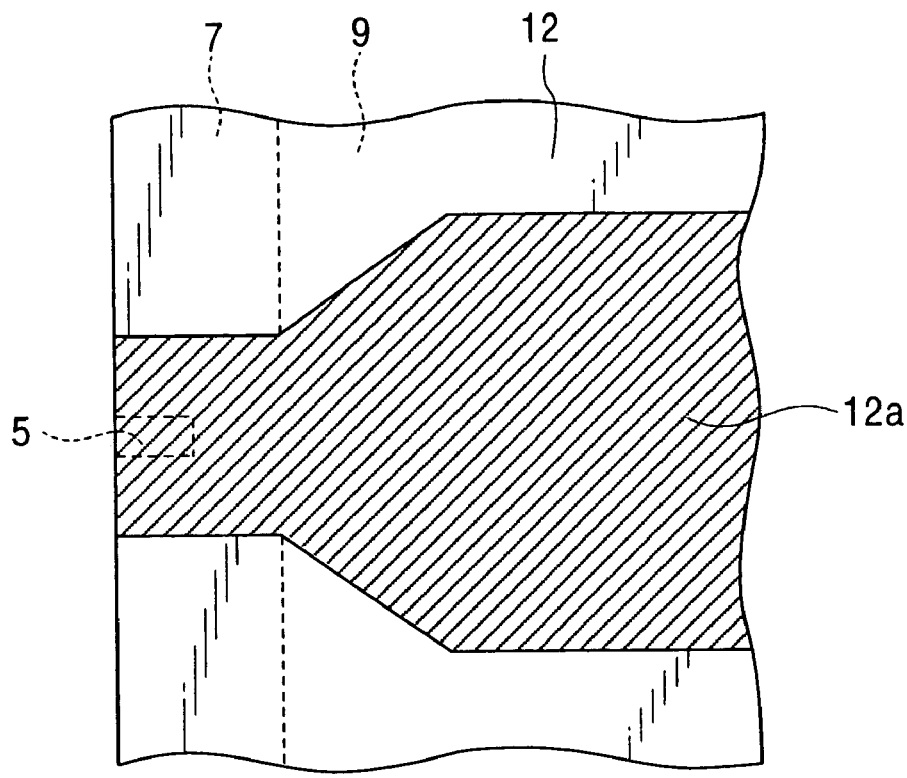
FIG. 31 is a partial plan view showing a step carried out subsequent to the step shown in FIG. 30.
Figure 32:
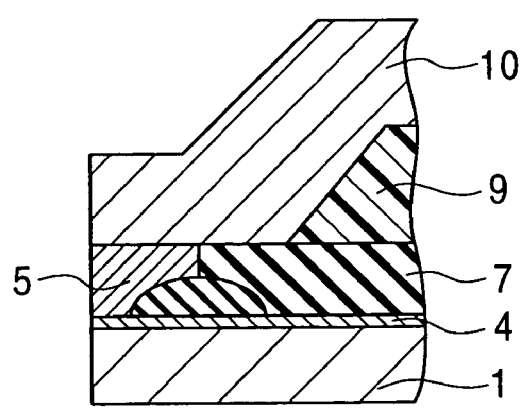
FIG. 32 is a partial sectional view showing a step carried out subsequent to the step shown in FIG. 31.

In accordance with the fabrication method of the present invention, the height h5 of the recording core 24 and the height h6 of the upper pole layer 35 on the Gd-setting insulating layer 27 are easily set within the predetermined sizes, and thus it is possible to fabricate a thin-film magnetic head with a high degree of consistency This is because of the fact that a step of trimming substantially perpendicular to the plane of the lower core layer 20 is not carried out. In contrast, in the conventional method generally illustrated in FIG. 27, the trimming step was necessary in order to suppress side fringing. Further, due to the trimming step, a significant decrease in the height of the upper pole layer 35 and variations in the track width Tw occurred. Thus, in the process of the prior art, the degree of consistency during fabrication was significantly decreased.

In the present invention, by forming the gap layer 22 constituting the recording core 24 with a nonmagnetic metallic material for plating, it is possible to continuously form the lower pole layer 21, the gap layer 22, and the upper pole layer 35 in that order from the bottom by plating in the groove 40a of the resist layer 40 shown in FIG. 15A. Accordingly, in the present invention, the lower pole layer 21, which protrudes from the lower core layer 20 with the track width Tw, and the gap layer 22 to be formed thereon with the track width Tw can be formed without performing trimming perpendicular to the plane of the lower core layer 20, and therefore it is possible to fabricate the thin-film magnetic head in which side fringing does not easily occur between the upper pole layer 35 and the lower core layer 20 without carrying out the trimming step.

However, in the present invention, in the step shown in FIGS. 16A and 16B, trimming may be performed. In such a case, ion irradiation is performed in inclined directions relative to the plane of the lower core layer 20, and the angle of ion irradiation is set, preferably, at about 45° to about 75° relative to the perpendicular direction to the plane, and more preferably, at about 60° to about 75°.

In the trimming step carried out with the ion irradiation angle as described above, magnetic dust generated by ion milling does not adhere to the sides of the recording core 24. In the present invention, since a step for ion-milling in which ions are irradiated substantially perpendicular to the plane of the lower core layer 20 is not carried out, even if trimming is performed in inclined directions relative to the plane of the lower core layer 20, variations in the shape of the recording core 24 do not easily occur, and the height of the recording core 24 is not significantly reduced.

In the present invention, the track width Tw of the recording core 24 can be further decreased by the trimming step described above, and it is possible to fabricate a thin-film magnetic head which is suitable for a decreased track width. Moreover, it is possible to form inclined planes 20b (refer to FIG. 1) in the upper surface of the lower core layer 20 on both sides of the recording core 24, and thus it is possible to fabricate a thin-film magnetic head in which side fringing can be further suppressed.

Figure 19:
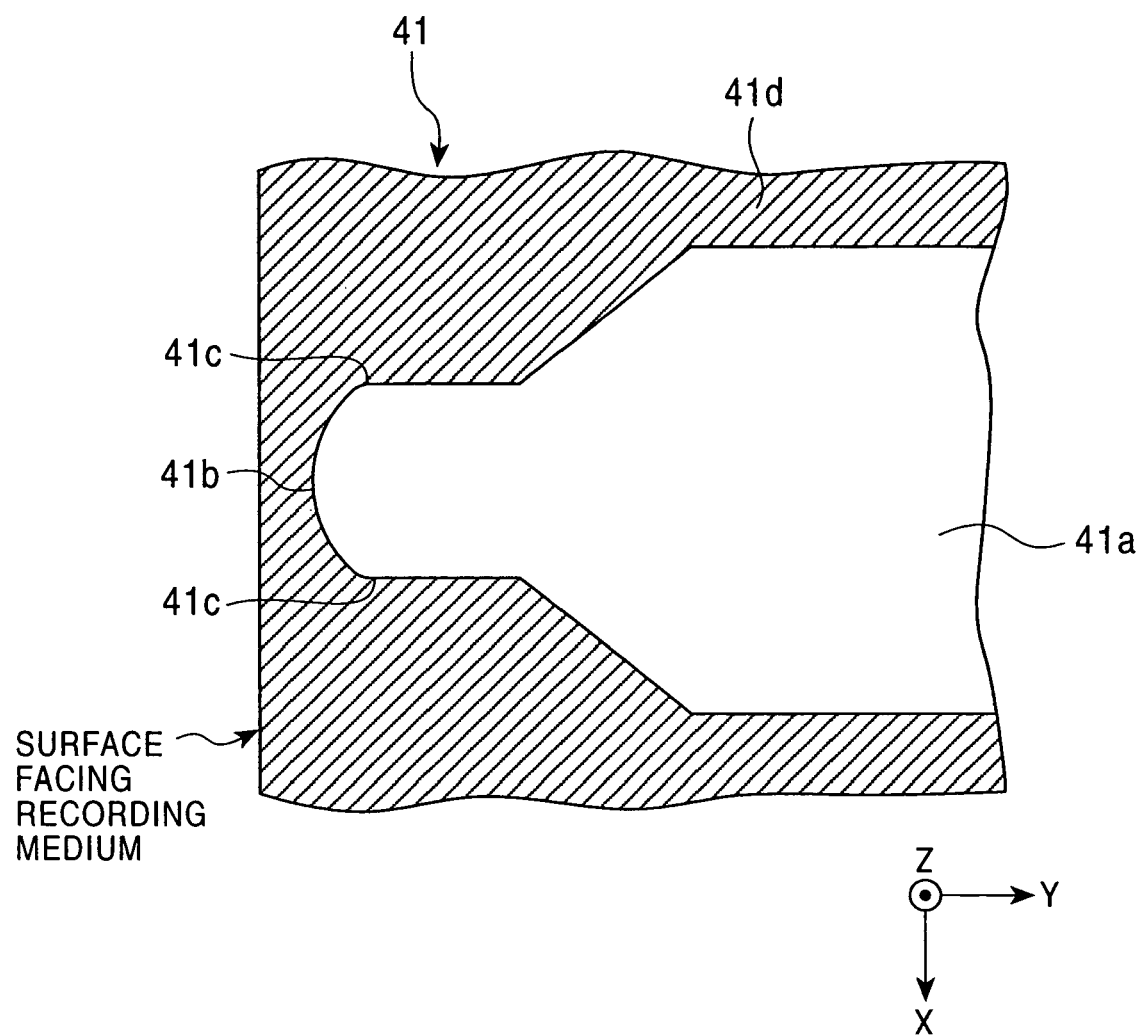
FIG. 19 is a partial plan view showing a step in accordance with the invention carried out subsequent to the step shown in FIGS. 18A and 18B.

Next, a coil layer and an insulating layer 32 for covering the coil layer are formed on the insulating layer 30. A resist layer 41, which is shown in FIG. 19, is formed over the upper pole layer 35, the insulating layer 30, and the insulating layer 32. Additionally, FIG. 19 is a partial plan view of the thin-film magnetic head. As shown in FIG. 19, a pattern 41a for forming an upper core layer 26 is formed in the resist layer 41. A tip surface 41b of the pattern 41a is set back from the face surface in the height direction (in the Y direction in the drawing), and the tip surface 41b also has a curvature which gradually recedes in the height direction toward both sides 41c in the track width direction.

In order to form the pattern 41a, in the present invention, during exposure, a portion 41d of the resist layer 41 other than the pattern 41a is irradiated with light, and the exposed resist layer 41d is developed, and the resist layer 41 corresponding to the pattern 41a is removed, leaving the resist layer 41d (image reverse process). The exposure and development described above are the reverse of the conventional method. Conventionally, a portion corresponding to the pattern 41a was irradiated with light. In the present invention, the resist layer 41d other than the pattern 41a is irradiated with light and developed, and the pattern 41a, which is not irradiated with light, is removed, due to the shape of the resist layer 41d.

Figure 20:
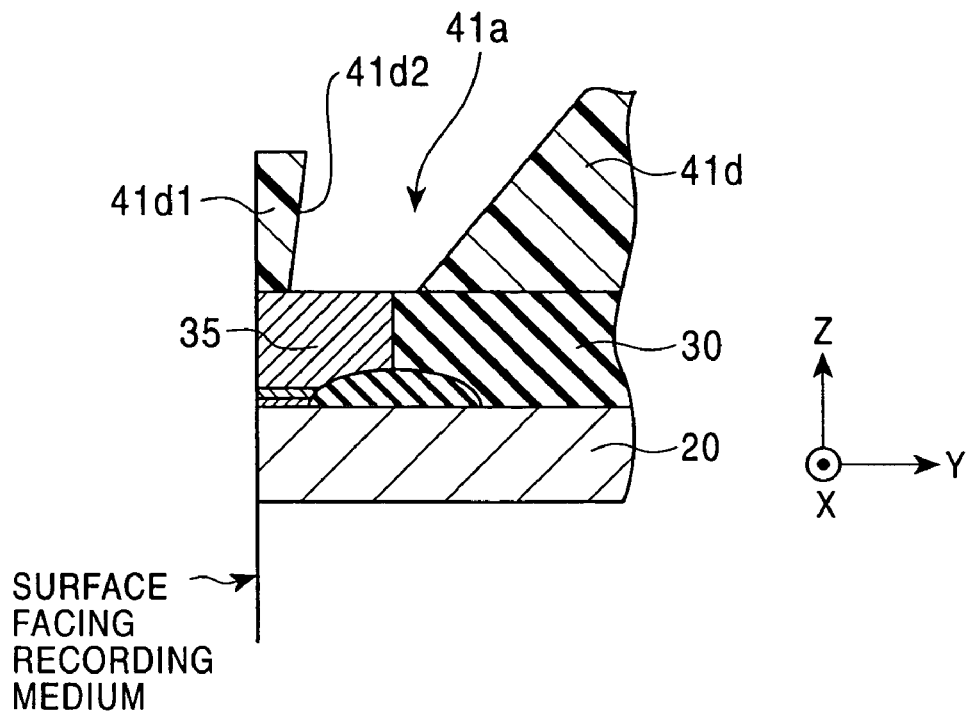
FIG. 20 is a partial sectional view showing a step in accordance with the invention carried out subsequent to the step shown in FIG. 19.
Figure 21:
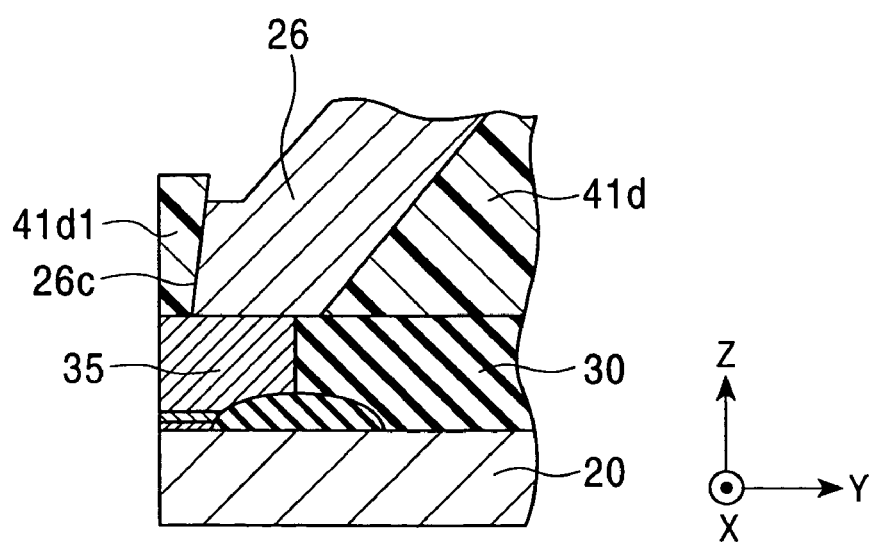
FIG. 21 is a partial sectional view showing a step in accordance with the invention carried out subsequent to the step shown in FIG. 20.

FIG. 20 is a partial cross-sectional view of the thin-film magnetic head in the present invention that shows only the shape of tip area of the thin-film magnetic head. As shown in FIG. 20, the resist layer 41d remains on the insulating layer 30 and the upper pole layer 35. In a resist layer 41d1, which is a portion of the resist layer 41d and which is left with a predetermined length from the surface facing the recording medium in the height direction, a back surface 41d2 thereof is an inclined surface or a curved surface which inclines or curves in the height direction (in the Y direction) from the lower core layer side to the upper core layer side (in the Z direction).

The resist layer 41d1 remains in the shape as described above because light is applied to the resist layer 41d which is left by the exposure and development. In contrast, if the pattern 41a, which is to be removed, is irradiated with light and the resist layer 41d is not irradiated with light, as shown in FIG. 22, the resist layer 41d1 remains with the back surface 41d2 being an inclined surface or a curved surface which inclines or curves in the opposite direction to the height direction (the Y direction) from the lower core layer side to the upper core layer side.

As shown in FIG. 20, when the back surface 41d2 of the resist layer 41d1 is an inclined surface or a curved surface, which inclines or curves in the height direction from the lower core layer side to the upper core layer side, it is possible to form a tip surface 26c of the upper core layer 26 into an inclined surface or a curved surface in which the depth in the height direction increases from the lower core layer side to the upper core layer side by plating a magnetic material for constituting the upper core layer 26 in the pattern 41a.

Figure 22:
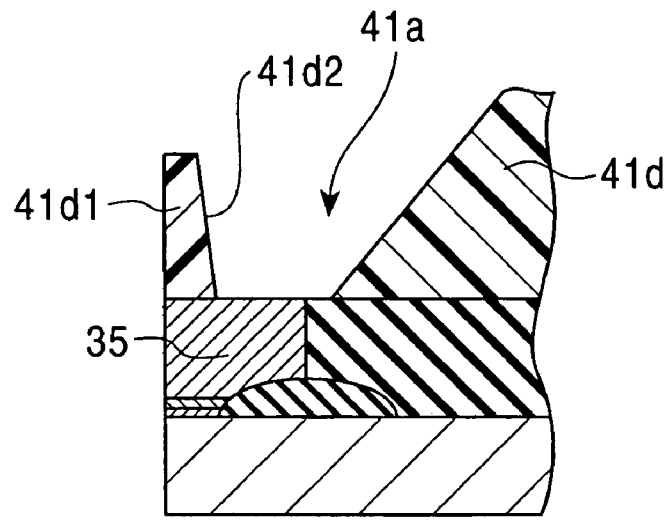
FIG. 22 is a partial sectional view showing another step in accordance with the invention carried out subsequent to the step shown in FIG. 19.
Figure 23:
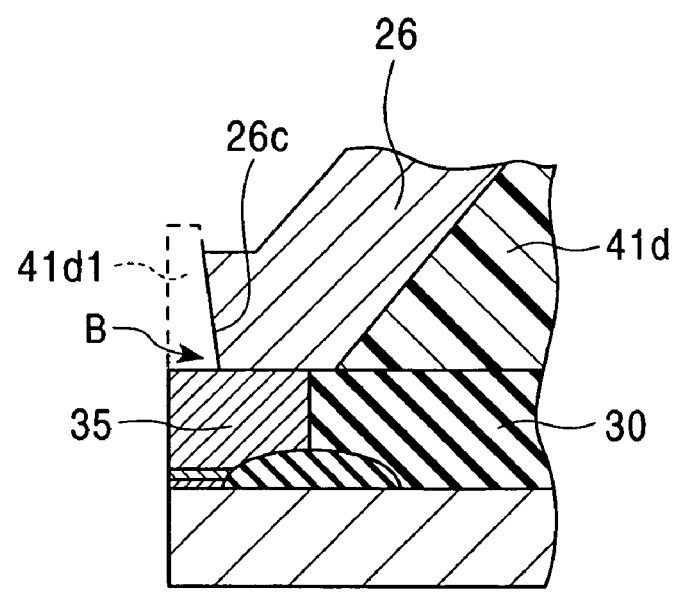
FIG. 23 is a partial sectional view showing a step in accordance with the invention carried out subsequent to the step shown in FIG. 22.
Figure 24:
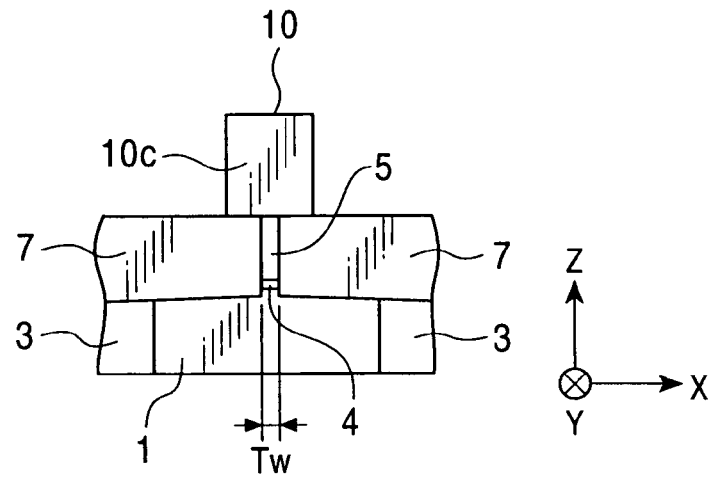
FIG. 24 is a partial front view of a conventional thin-film magnetic head.
Figure 25:
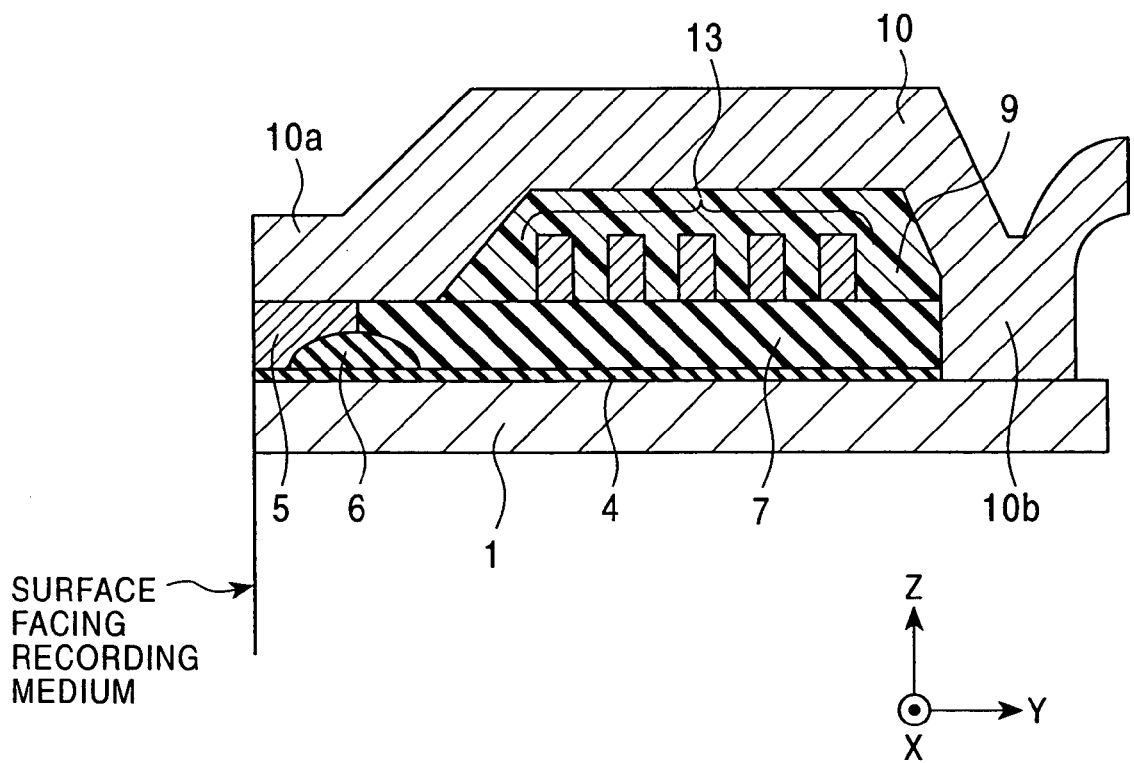
FIG. 25 is a partial sectional view of the thin-film magnetic head shown in FIG. 24.
Figure 26:
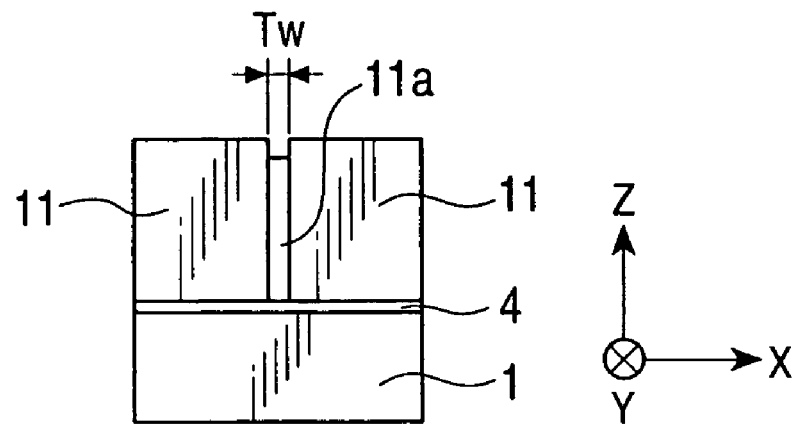
FIG. 26 is a partial front view showing a step in a method for fabricating a conventional thin-film magnetic head.

As shown in FIG. 22, if the back surface 41d2 of the remaining resist layer 41d1 is an inclined surface or a curved surface which inclines or curves in the opposite direction to the height direction (the Y direction) from the lower core layer side to the upper core layer side, when a magnetic material for constituting the upper core layer 26 is plated in the pattern 41a, as shown in FIG. 23, the tip surface 26c of the upper core layer 26 is formed into an inclined surface or a curved surface which inclines or curves in the direction opposite to the height direction from the lower core layer side to the upper core layer side.

In the thin-film magnetic head shown in FIG. 23, when a protective layer 34 composed of $Al_2O_3$ or the like is formed in a space B between the surface facing the recording medium and the tip surface 26c of the upper core layer 26, it is difficult to completely fill the space B with the protective layer 34, and a cavity is easily formed in the space B.

Therefore, in the present invention, in the step shown in FIG. 19, the resist layer 41d other than the pattern 41a for the upper core layer 26 is irradiated with light, followed by development. Thereby, the tip surface of the pattern 41a to be removed is formed into an inclined surface or a curved surface, which inclines or curves in the height direction from the lower core layer side to the upper core layer side, so that the tip surface 26c of the upper core layer 26 is an inclined surface or a curved surface in which the depth in the height direction increases from the lower core layer side to the upper core layer side.

The method which has been described with reference to FIGS. 15A and 15B to FIG. 21 relates to a thin-film magnetic head in which the upper core layer 26 is set back from the surface facing the recording medium in the height direction, and the tip surface 26c of the upper core layer 26 is an inclined surface or a curved surface in which the depth in the height direction increases from the lower core layer side to the upper core layer side. Also, the tip surface 26c has a curvature that gradually recedes in the height direction toward both sides in the track width direction. A method for fabricating a thin-film magnetic head in another embodiment will be described below.

In the embodiments shown in FIG. 5 or 6, the upper core layer 26 is set back from the surface facing the recording medium in the height direction (in the Y direction), and the tip surface 26c of the upper core layer 26 is an inclined surface or a curved surface in which the depth in the height direction increases from the lower core layer side to the upper core layer side. However, the tip surface 26c does not have a curvature in the track width direction (in the X direction) and the tip surface 26c has a planar shape in the track width direction.

In the structure described above, in the step shown in FIG. 19, in order to form the same pattern as that of the upper core layer 26 shown in FIG. 5 or 6 in the resist layer 41, light is applied to the region other than the pattern, followed by development. Thereby, the tip surface of the pattern to be removed is formed into an inclined surface or a curved surface that recedes in the height direction from the lower core layer side to the upper core layer side, and the tip surface is set back from the surface facing the recording medium in the height direction. By plating a magnetic material constituting the upper core layer 26 in the pattern, the upper core layer 26 having the shape shown in FIG. 5 or 6 is formed.

In the embodiments shown in FIGS. 7 to 10, the tip surface 26c of the upper core layer 26 is positioned at the surface facing the recording medium, and the tip surface 26c is an inclined surface or a curved surface in which the depth in the height direction gradually increases from the lower core layer side to the upper core layer side, and also the tip surface 26c has a curvature which gradually recedes in the height direction toward both sides in the track width direction.

In such a structure, in the step shown in FIG. 19, in order to form the same pattern as that of the upper core layer 26 shown in FIG. 9 or 10 in the resist layer 41, light is applied to the region other than the pattern, followed by development. Thereby, the tip surface of the pattern to be removed is formed into an inclined surface or a curved surface that recedes in the height direction from the side of the lower core layer to the side of the upper core layer, and the tip surface is set at the same position as that of the surface facing the recording medium. By plating a magnetic material for constituting the upper core layer 26 in the pattern, the upper core layer 26 having the shape shown in FIG. 9 or 10 is formed.

In the embodiment shown in FIGS. 11 to 14, the tip surface 26c of the upper core layer 26 is positioned at the surface facing the recording medium, and the tip surface 26c has a curvature which gradually recedes in the height direction toward both sides in the track width direction. However, the tip surface 26c is not an inclined surface or a curved surface in which the depth in the height direction increases from the lower core layer side to the upper core layer side, and the tip surface 26c is parallel to the surface facing the recording medium. In such a structure, in the step shown in FIG. 19, the same pattern as that of the upper core layer 26 shown in FIG. 13 or 14 is formed in the resist layer 41 by exposure and development.

When the exposure and development are performed, the portion corresponding to the pattern may be irradiated with light or the portion other than the pattern may be irradiated with light. In such a structure, since the tip surface 26c is not an inclined surface or a curved surface in which the depth in the height direction increases from the lower core layer side to the upper core layer side, when the exposure and development are performed, light may be applied either to the pattern corresponding to the upper core layer 26 or the portion other than the pattern.

After the pattern for the upper core layer 26 is formed by the exposure and development, by plating a magnetic material for constituting the upper core layer 26 in the pattern, the upper core layer 26 having the shape shown in FIG. 13 or 14 is formed.

As described above, in accordance with the fabrication method of the present invention, the recording core 24, which is a three-layered film consisting of the lower pole layer 21, the gap layer 22, and the upper pole layer 35 or a two-layered film consisting of the gap layer 22 and the upper pole layer 35, for defining the track width Tw can be formed by continuous plating. Consequently, a trimming step in which ions are irradiated substantially perpendicular to the plane of the lower core layer 20, as is the case in the conventional method, is not required, and thus it is possible to fabricate a thin-film magnetic head with a high degree of consistency.

In accordance with the method for fabricating the thin-film magnetic head of the present invention, the resist layer for forming the upper core layer 26 can be formed so that the tip surface of the pattern is an inclined surface or a curved surface that recedes in the height direction from the lower core layer side to the upper core layer side by applying light to the portion of the resist layer other than the portion corresponding to the pattern. Consequently, it is possible to form the tip surface 26c of the upper core layer 26 so that the depth in the height direction increases from the lower core layer side to the upper core layer side.

Although the recording core 24 is formed first on the lower core layer 20 and the insulating layer 30 is then formed so as to cover the recording core 24 as shown in FIGS. 15A and 15B to FIGS. 18A and 18B, the present invention is not limited thereto. For example, the insulating layer 30 may be formed first on the lower core layer 20 and a groove is formed in the insulating layer 30, and then the recording core 24 is formed in the groove.

As described in detail, in accordance with the present invention, by setting back the tip surface of the upper core layer from the surface facing the recording medium in the height direction, and also by setting the tip surface to be an inclined surface or a curved surface in which the depth in the height direction increases from the lower core layer side to the upper core layer side, it is possible to suppress side fringing. It is also possible to efficiently apply the flux from the upper core layer to the upper pole layer. Thus, it is possible to fabricate a thin-film magnetic head that is suitable for an increased recording density. Most preferably, the tip surface of the upper core layer has a curvature which gradually recedes in the height direction toward both sides in the track width direction, and thus it is possible to suppress side fringing.

In accordance with the fabrication method of the present invention, it is possible to fabricate a thin-film magnetic head for suppressing side fringing without a trimming step in which ion irradiation is performed substantially perpendicular to the lower core layer. Thus, thin-film magnetic heads can be fabricated with a high degree of consistency Further, when the resist layer for forming the upper core layer is exposed and developed, by applying light to the portion of the resist layer other than the portion corresponding to the pattern for the upper core layer, it is possible to easily form an inclined surface or a curved surface in which the depth in the height direction increases from the lower core layer side to the upper core layer side.

What is claimed is:

1. A thin-film magnetic head comprising:
   a lower core layer;
   a recording core formed on the lower core layer and exposed at a face surface that faces a recording medium, the recording core comprising a lower pole layer, a gap layer, and an upper pole layer sequentially arranged in that order;
   an upper core layer magnetically coupled to the upper pole layer; and
   a first coil layer and a second coil layer overlying the first coil layer, the first and second coil layers inducing a recording magnetic field to the lower core layer, the recording core, and the upper core layer,
   wherein a tip surface of the upper core layer contacts the upper pole layer and is located at a setback distance from the face surface in a height direction, wherein the height direction is a direction generally perpendicular to the face surface, and the tip surface is a curved surface, both at a portion of the tip surface in contact with the upper pole layer and at both sides in the track width direction of the portion of the tip surface in contact with the upper pole layer, such that the setback distance gradually increases in a track width direction from a point where the tip surface contacts the upper pole layer, wherein the track width direction is a direction generally parallel to the face surface; and
   wherein the recording core further comprises:
   a front region which extends from the face surface in the height direction and has a uniform width in the track width direction;
   and a back region which extends from the front region in the height direction and in which a width of the back region in the track width direction gradually increases in the height direction.

2. A thin-film magnetic head according to claim 1, wherein the upper core layer comprises:
   a front region which extends from the tip surface in the height direction and has a uniform width in the track width direction; and
   a back direction region which extends from a side opposite the tip surface in the height direction and in which the width of the back region in the track width direction gradually increases in the height direction.

3. A thin-film magnetic head according to claim 1, wherein the upper core layer further comprises an edge surface in contact with the upper pole layer, and wherein, at the edge surface, the width of the upper core layer in the track width direction is greater than the width of the upper pole layer in the track width direction.

4. A thin-film magnetic head according to claim 1, wherein the upper core layer is connected to at least the back region of the recording core.

5. A thin-film magnetic head according to claim 1, wherein the gap layer comprises a nonmagnetic metallic material.

6. A thin-film magnetic head according to claim 5, wherein the nonmagnetic metallic material is at least one material selected from the group consisting of NiP, NiPd, NiW, NiMo, Au, Pt, Rh, Pd, Ru, and Cr.

7. A thin-film magnetic head according to claim 1 further comprising an insulating layer residing between the first and second coil layers.

8. A thin-film magnetic head according to claim 1, wherein the first and second coil layers comprise spirally wound coil layers.

9. A thin-film magnetic head according to claim 1, wherein the first and second coil layers comprises individual conducting sections having spaces between the individual conducting sections, and wherein the spaces are filled with an insulating material.

* * * * *